United States Patent
Spain

(10) Patent No.: US 12,078,113 B2
(45) Date of Patent: Sep. 3, 2024

(54) COMPRESSOR MODULE

(71) Applicant: BAE SYSTEMS plc, London (GB)

(72) Inventor: James William Spain, Barrow (GB)

(73) Assignee: BAE SYSTEMS PLC, London (GB)

(*) Notice: Subject to any disclaimer, the term of this patent is extended or adjusted under 35 U.S.C. 154(b) by 725 days.

(21) Appl. No.: 17/282,044

(22) PCT Filed: Oct. 9, 2019

(86) PCT No.: PCT/GB2019/052860
§ 371 (c)(1),
(2) Date: Apr. 1, 2021

(87) PCT Pub. No.: WO2020/074892
PCT Pub. Date: Apr. 16, 2020

(65) Prior Publication Data
US 2021/0388730 A1    Dec. 16, 2021

(30) Foreign Application Priority Data

Oct. 12, 2018  (GB) ..................... 1816625

(51) Int. Cl.
*F02C 9/18*    (2006.01)
*F01D 9/04*    (2006.01)
(Continued)

(52) U.S. Cl.
CPC ............ *F02C 9/18* (2013.01); *F01D 9/041* (2013.01); *F01D 25/12* (2013.01); *F02C 1/10* (2013.01);
(Continued)

(58) Field of Classification Search
CPC .. F02C 7/143; F02C 9/18; F01D 25/12; F01D 25/08
See application file for complete search history.

(56) References Cited

U.S. PATENT DOCUMENTS 5,768,893 A    6/1998   Hoshino et al.
9,353,687 B1   5/2016   Brostmeyer et al.
(Continued)

FOREIGN PATENT DOCUMENTS

CN    1687566 A    10/2005
CN    107023317 A    8/2017
(Continued)

OTHER PUBLICATIONS

International Search Report and Written Opinion received for PCT Application No. PCT/GB2019/052857. Mail date: Jan. 31, 2020. 9 pages.
(Continued)

*Primary Examiner* — Abiy Teka
(74) *Attorney, Agent, or Firm* — Finch & Maloney PLLC

(57) ABSTRACT

A compressor module (200) wherein the compressor module (200) defines a working fluid flow duct (60) between a compressor module inlet (210) and a compressor module outlet (214). The compressor module comprises: a first heat exchanger (37) and a compressor rotor stage (24) each provided in the working fluid flow duct (60). The first heat exchanger (37) is provided in flow series between the compressor module inlet (210) and the compressor rotor stage (24). The compressor stage (24) is provided in flow series between the first heat exchanger (37) and the compressor module outlet (214). The first heat exchanger (37) is defined by a wall (226) having an external surface (282) which is located in the working fluid flow duct (60). There is provided a heat sink unit (236) which defines a portion (240) of the working fluid flow duct (60) in flow series between the compressor rotor stage (24) and compressor module outlet (214). The first heat exchanger (37) is in heat transfer communication with the heat sink unit (236). The first heat exchanger (37) is configured such that it is operable (Continued)

to transfer heat to the heat sink unit (236) from the working fluid (250) passing the first heat exchanger (37).

20 Claims, 19 Drawing Sheets

(51) Int. Cl.
    *F01D 25/12*      (2006.01)
    *F02C 1/10*      (2006.01)
    *F02C 7/143*      (2006.01)
    *F02K 3/115*      (2006.01)
    *F04D 19/00*      (2006.01)
    *F04D 29/58*      (2006.01)

(52) U.S. Cl.
    CPC .............. *F02C 7/143* (2013.01); *F02K 3/115* (2013.01); *F04D 19/002* (2013.01); *F04D 29/5826* (2013.01)

(56) References Cited

U.S. PATENT DOCUMENTS

| | | |
|---|---|---|
| 10,145,253 B2 | 12/2018 | Bordoni |
| 11,078,795 B2 | 8/2021 | Jonnalagadda et al. |
| 2009/0260361 A1 | 10/2009 | Prueitt |
| 2012/0063882 A1 | 3/2012 | Moore et al. |
| 2013/0239542 A1 | 9/2013 | Dasgupta et al. |
| 2014/0007569 A1 | 1/2014 | Gayton |
| 2017/0159489 A1 | 6/2017 | Sennoun |
| 2017/0306979 A1* | 10/2017 | Iurisci .................. F04D 29/441 |
| 2018/0231029 A1 | 8/2018 | Cherry et al. |
| 2021/0363892 A1 | 11/2021 | Spain |

FOREIGN PATENT DOCUMENTS

| | | |
|---|---|---|
| CN | 207960696 U | 10/2018 |
| DE | 3424925 C1 | 10/1985 |
| DE | 102009043720 A1 | 4/2011 |
| JP | H10169404 A | 6/1988 |
| JP | 2016514228 A | 5/2016 |
| JP | 2018505991 A | 3/2018 |
| WO | 2020074889 A1 | 4/2020 |
| WO | 2020074892 A1 | 4/2020 |

OTHER PUBLICATIONS

Search Report under Section 17(5) received for GB Application No. 1816624.9, dated Apr. 5, 2019. 3 pages.

Heo, et al., "An Investigation of Turbomachinery Concepts for an Isothermal Compressor Used in an S—CO2 Bottoming Cycle," The 6th International Supercritical CO2 Power Cycles Symposium, Mar. 27-29, 2018. pp. 1-10.

International Preliminary Report on Patentability received for PCT Application No. PCT/GB2019/052860. Mail date: Apr. 22, 2021. 11 pages.

International Preliminary Report on Patentability received for PCT Application No. PCT/GB2019/052857. Mail date: Apr. 22, 2021. 8 pages.

International Search Report and Written Opinion received for PCT Application No. PCT/GB2019/052860. Mail date: Jan. 27, 2020. 14 pages.

Search Report under Section 17(5) received for GB Application No. 1816625.6, dated Apr. 10, 2019. 4 pages.

* cited by examiner

SECTION B-B

SECTION A-A

SECTION A-A

COMPRESSOR MODULE

The present disclosure relates to a compressor module.

In particular the disclosure is concerned with a compressor module for a thermodynamic apparatus for example a heat engine or a heat pump.

BACKGROUND

Heat engines (for example gas turbines) with regenerators have been known for a significant amount of time. A heat exchanger may be provided to transfer heat from exhaust gas exiting a turbine to compressed air exiting the compressor, reducing the required heat input and improving the efficiency of the system.

In some cases machines have been designed which transfer heat from the compressor, to the latter stages of the turbine.

Although not appropriate to all applications, heat or cooling may be achieved between rotor stages by mixing working gas flows, although this is limited by the availability of working fluid available downstream of the compressor and/or turbine. Alternatively heat transfer may be achieved by passing working fluid through a heat exchanger external to the turbine and/or compressor, which adds to size and complexity of the apparatus. All of these methods are aimed to add additional heat to expanded working fluid downstream of a turbine rotor stage, or remove heat from compressed working fluid downstream of the compressor rotor stage.

However, all the systems have the demerit of being limited to the availability of working fluid passing through the apparatus, or require bulky apparatus (for example external heat exchangers external to the turbine and/or compressor) which take up an undesirable amount of space and inherently introduce losses to the system by virtue of inevitable heat transfer to/from the environment surrounding the apparatus. These are significant considerations for applications such as use in power generation or power storage systems, especially where they are provided on vehicles including, but not limited to, vessels (e.g. boats or ships).

Hence a system which increases the thermal efficiency of a compressor, and hence the thermal efficiency of an apparatus it forms part of (for example a heat engine) which may also be packaged/constructed to occupy less space than apparatus of the related art, is highly desirable.

SUMMARY

According to the present disclosure there is provided apparatus as set forth in the appended claims. Other features of the invention will be apparent from the dependent claims, and the description which follows.

Hence there may be provided a compressor module, which may form part of a heat engine, or may be provided as an alternative to a convention compressor in other applications. There may also be provided a compressor assembly comprising a number of the compressor modules, or a thermodynamic apparatus (for example a heat engine, heat pump or compressor) operable to increase the thermal efficiency of systems to which it is incorporated relative to examples of the related art.

The apparatus of the present disclosure is also advantageous as it may be produced as a more compact unit (i.e. requiring less space) and requires fewer supporting systems relative to equivalent examples of the related art. Hence it may result in a cheaper system to manufacture, assemble, deliver and operate compared to currently available alternatives for the same power produced, thereby providing a significant competitive advantage.

BRIEF DESCRIPTION OF THE DRAWINGS

Examples of the present disclosure will now be described with reference to the accompanying drawings, in which.

Figure 1:
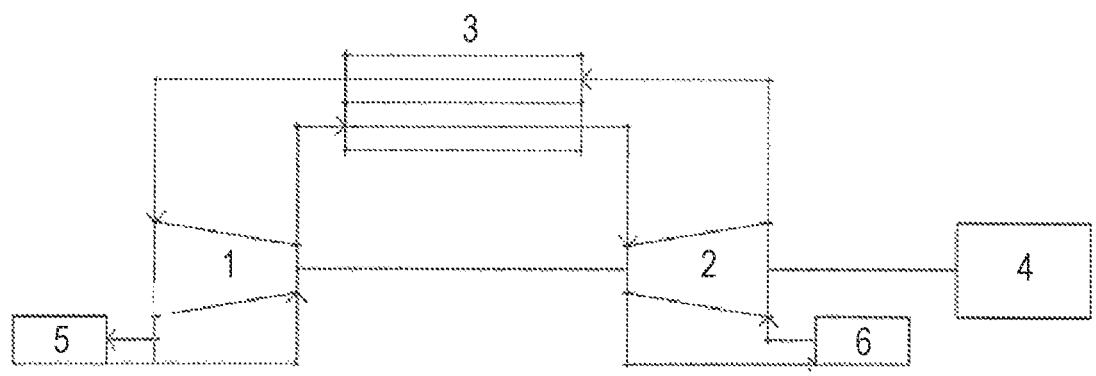
FIGS. 1 to 4 show examples of a heat engine configurations which may include a compressor and/or turbine of the present disclosure.

Reference numerals used in the figures of the present disclosure are identified in the non exhaustive list below:

1 Compressor
2 Turbine
3 Counter flow heat exchanger
4 Generator
5 Cooler

-continued

6 Heater
7 Control Valve 1
8 Control Valve 2
9 Control Valve 3
10 Control Valve 4
12 Counter flow heat exchanger
13 Counter flow heat exchanger
14 Heat transfer fluid return
15 Heat transfer fluid supply
16 Heat transfer fluid supply
17 Medium pressure inlet
18 Low pressure inlet
19 Outer cylinder & secondary pressure containment
20 Inner cylinder part 1
21 Pipe connection seals
22 Pipe connection seals
23 Pipe connection seals
24 Compressor/Turbine disk
25 Compressor/Turbine shaft
26 Diaphragm
27 Diaphragm
28 Heat transfer fluid outlet channel
29 Heat transfer fluid inlet channel
30 Heat transfer fluid outlet channel
31 Pipe flange connection
32 Diaphragm fixing dowel
33 Heat transfer fluid seal and drain arrangement
34 Working fluid sealing arrangement
35 Inner cylinder bolting arrangement
36 Inner cylinder plate 2
37 Cooled diffuser arrangement/Heated nozzle arrangement
38 Inter stage cooling/heating arrangement
39 Inner cylinder plate 3
40 Inner cylinder plate 4
41 Aerodynamic fairing piece
42 Fitted step on shaft
43 Compressor/Turbine wheel bolting arrangement
44 Compressor/Turbine inlet dividing plate
45 Heated working fluid nozzle
46 Outer cylinder seal arrangement
47 Outer cylinder bolting arrangement
48 Power take off
49 Speed linked pump - heater
50 Power take off
51 Pump
52 Thrust bearing & combined radial bearing
53 Radial bearing
54 Bearing housing keys
55 Bearing housing keys
56 Heat transfer reduction air gap
57 Heat transfer reduction air gap
58 Shaft thrust collar
59 Gland type seals
60 Inter-stage cooling/heating working fluid channel
61 Compressor/Turbine bypass valve
62 Stop Valve
63 Compressor/Turbine end plate
64 Compressor/Turbine end plate
65 Bearing support surface structural component
66 Bearing support surface structural component
67 Cylinder seal insert
68 Combined flow heat exchanger
69 Fluid guide shapes
70 Inlet manifold tube
71 Outlet manifold tube
72 Heat transfer tubes
73 Alignment bar hole
74 Diaphragm plate
75 Diaphragm plate
76 Diaphragm plate
77 Diaphragm plate
78 Working fluid reservoir
79 Working fluid reservoir inlet isolation valve
80 Working fluid reservoir outlet isolation valve
81 Shaped fins, Studs, bars forming heat transfer surface
82 Heater or Cooler fluid supply and return holes
83 Hollow shaped fins, Studs, bars or tubes forming heat transfer surface
84 Seal weld location

DETAILED DESCRIPTION

The present disclosure relates to a heat managed compressor system and/or a closed loop heat engine control system comprising a turbine system and/or a compressor system of the present disclosure. A working fluid is passed through the compressor and/or turbine, and a heat transfer fluid (for example a coolant for removal of heat from the working fluid in the compressor, or a heating medium for addition of heat to the working fluid in the turbine) is passed through the body of the compressor/turbine module.

The turbine system and/or compressor system of the present disclosure may be used in power generation applications using regenerative, reheated, intercooled closed cycle turbo machinery. A turbine module of the present disclosure may be operable to approximate isothermal expansion. A compressor of the present disclosure may approximate isothermal compression. Hence the turbine module and compressor module may be included into a heat engine based on a closed cycle gas turbine arrangement for producing power from a heat source. This arrangement of equipment may provide a heat engine which operates in a manner approximating the Ericsson thermodynamic cycle.

Figure 23:
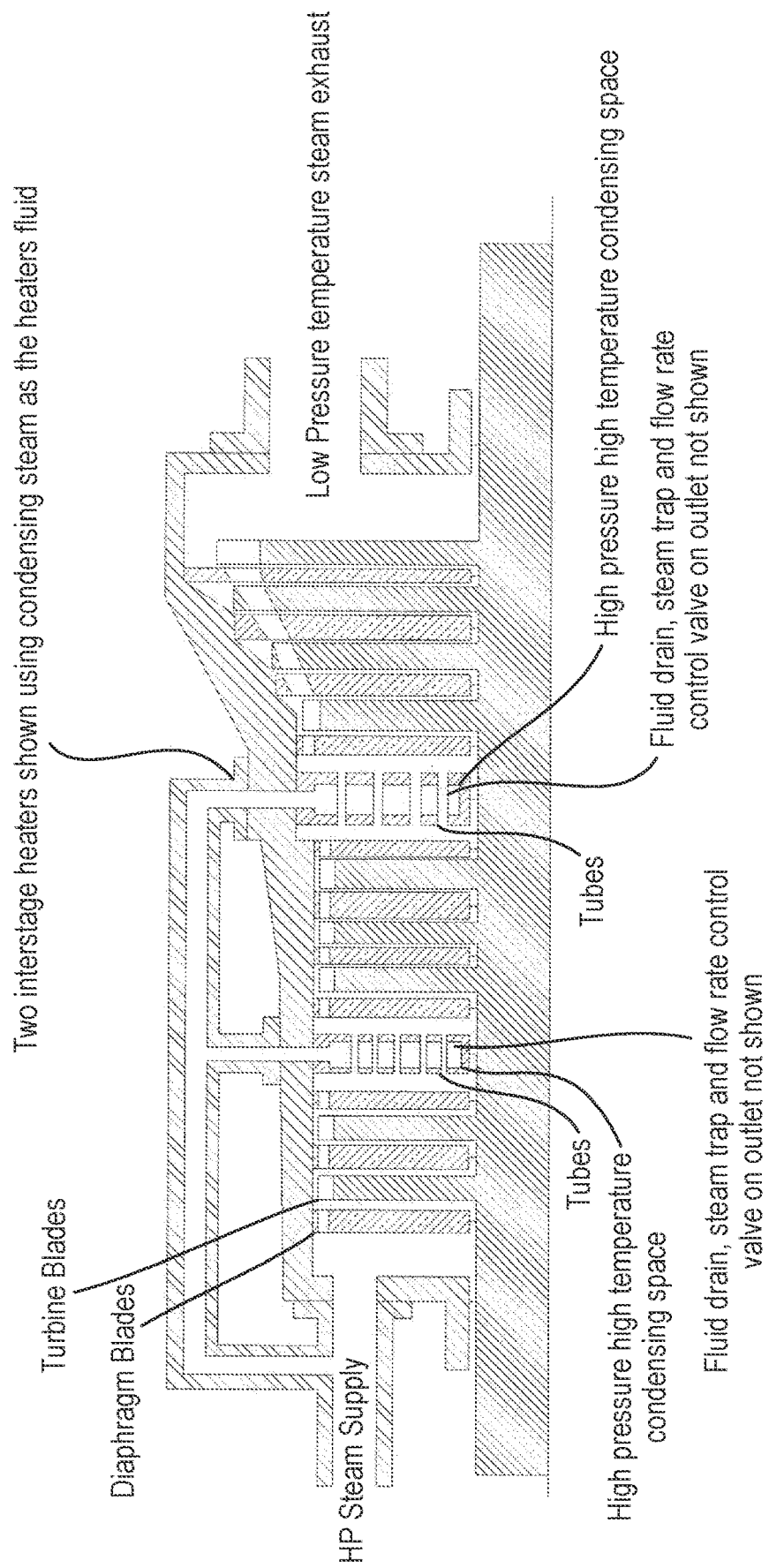
FIG. 23 shows an axial steam turbine comprising a compressor and/or turbine of the present disclosure.

The turbine system of the present disclosure may be used in power generation applications using regenerating, reheated, Rankine cycle turbo machinery, approximating a Re-heated Rankine cycle without the need for the working fluid to return to a heater externally to the turbine. An example of one turbine arrangement in this application is shown in FIG. 23.

The apparatus of the present disclosure may also include equipment operable to control, start and stop and seal the machinery. The present disclosure may also relate to a method of manufacture and assembly of a compressor and/or turbine according to the present disclosure.

Heat Engine

FIG. 1 shows a known arrangement of equipment arranged as a heat engine including a cooled compressor 1, a heated turbine 2, a fluid heater 6 (configured to be in heat flow communication with a heat source), a fluid cooler 5 (configured to be in heat flow communication with a heat sink) and a recuperator (heat exchanger) 3 to create a heat engine. This can be used to drive a generator 4, or alternatively a propulsion shaft and propeller, a compressor, pumps or other power consuming equipment. It can also power combinations of these items. This is achieved using the turbine inter-stage heating and nozzle heater, and a compressor with cooled diaphragm blading and inter-stage cooling according to the present disclosure herein described. It would result in a heat engine with extremely high thermodynamic efficiency, and a simple design which can be manufactured using the components as described.

Heat sources can include but are not limited to: burning fuel, reactors, thermal solar and/or geothermal.

In FIG. 1 the heater fluid supply and return, and cooler fluid supply and return pipework, is shown as a single line for illustration purposes only. Each of these pipes can pass through a manifold, and split into the many supply and return lines to provide fluid at the same temperature to each heating or cooling element.

Figure 13:
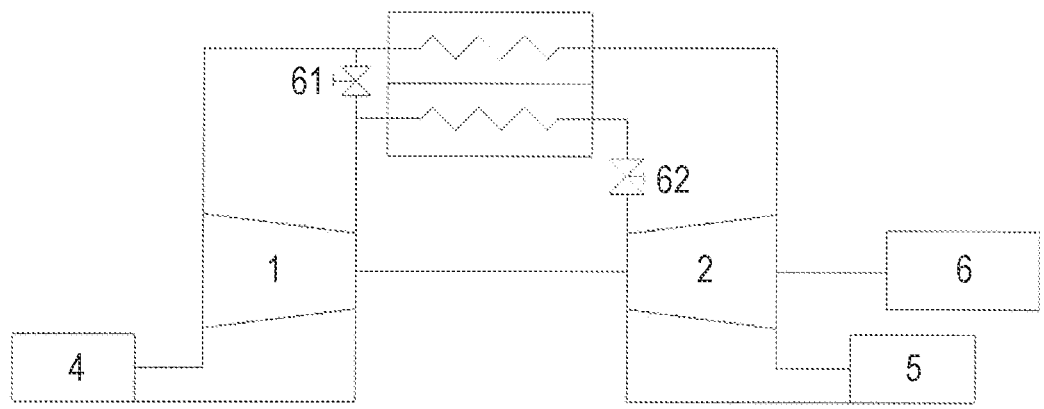
FIG. 13 shows and examples of a heat engine configuration which may include a compressor and/or turbine of the present disclosure.

FIG. 13 shows the same arrangement as shown in FIG. 1, with the addition of a stop valve 62 in flow series between the heat exchanger 3 and the turbine 2, provided as a means of stopping the turbine in an emergency. Engaging this may over-pressurise the system, however it may also provide a direct stop to power production which can be used to prevent damage to the machine from loss of load, over speed and emergency scenarios. The valve can be actuated automatically by the control system via an over speed trip. Any commonly used rotational speed sensor type arrangement can be used.

Also as shown in FIG. 13 is a turbine bypass valve 61 in flow series between the heat compressor 1 and the heat exchanger 3, in flow communication between the compressor outlet and compressor inlet. This valve is normally closed, forcing the compressed fluid from the compressor through the turbine and heat exchanger. If the load is removed from the turbine when operating at a high power state, there is a danger of the turbine rotational speed increasing rapidly, beyond its design limits. Opening the bypass valve provides a recirculation path for the fluid through the compressor, avoiding the turbine, resulting in a loss of power. If the valve and pipework is sized to have a larger area then than the turbine inlet, and to open fast enough, the over-speed condition can be avoided in a loss of load case. This valve can also be used as a throttle under partial load if required. The valves can be manually, hydraulically or electrically actuated, and be of ball, butterfly, throttle or slide type.

Alternative positions for the pipework connections leading to the valve can be at the turbine inlet and exit. Other alternatives can link across the heat exchanger (e.g. compressor outlet to turbine outlet).

Figure 2:
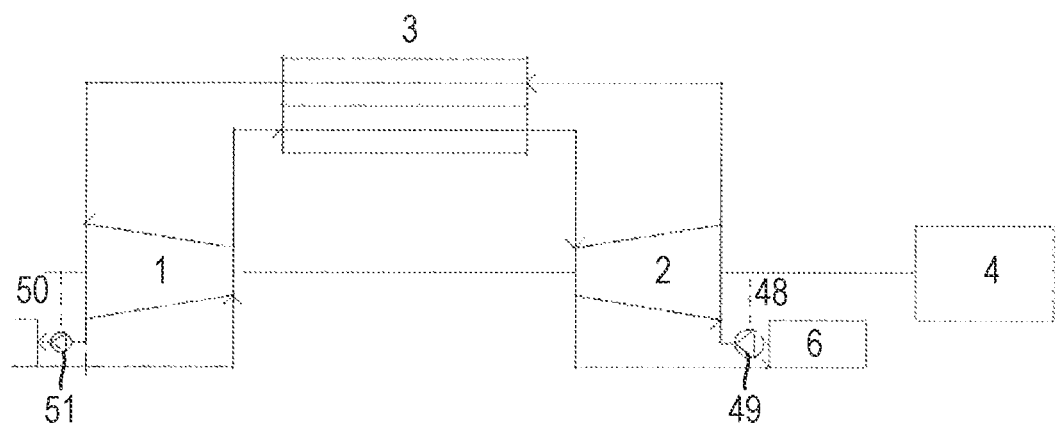

FIG. 2 shows an arrangement of equipment where pumps for the heater 6 and cooler 5 are directly driven off the machine shafting, linking the heater and cooler flow rate to the running speed of the machine. This can be achieved through a bevel gear drive on the shaft, a belt drive, a straight cut or helical gearbox, a chain drive or by directly linking the pumps to the shaft with a flexible coupling. Linking the heater flow rate to the shaft speed is beneficial in variable speed machines, as it links the power required in the working fluid to the heat input to the machine.

Figure 3:
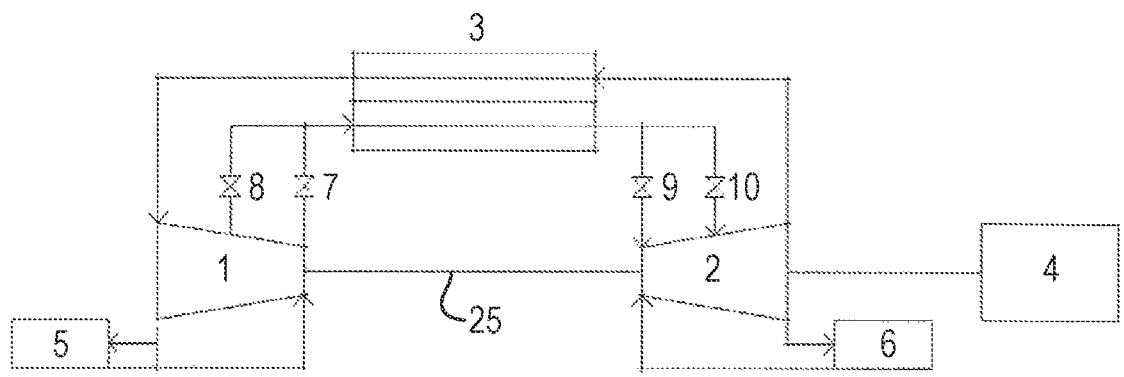

FIG. 3 shows an arrangement for controlling the power output of a heat engine comprising a compressor module and/or turbine module according to the present disclosure with minimal effect on the heat engine efficiency. An amount of the working fluid can be removed from the cycle in between two stages using control valve 8, resulting in a lower pressure of the working fluid entering the turbine. Additionally, the control valve 10 can allow the working fluid to enter the turbine in between stages. This arrangement of valves removes the need for a restrictive throttle valve, which would control the power output by decreasing the efficiency of the working fluid cycle.

The valves can be manually, hydraulically or electrically actuated, and of ball, butterfly, throttle or slide type. The control system may take the temperature and pressure readings and adjust the valves, changing the internal flow to optimise the machine efficiency under any load conditions.

Figure 4:
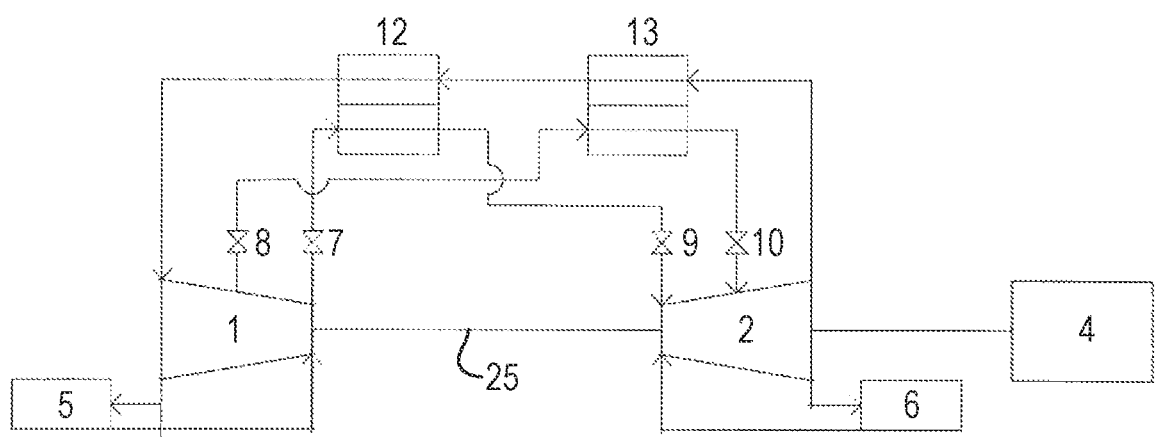

FIG. 4 shows an alternative arrangement for controlling the power of a heat engine according to the present disclosure. The first stages of the compressor and last stages of the turbine are optimised for a higher mass flow rate of working fluid than the latter compressor stages and early turbine stages. Control valves 7, 8, 9, 10 and separate flow paths are used to vary the flow between different stages of the turbine and compressor. This results in a design which can alter the power output of the machine without great loss of efficiency in the turbine or compressor, at constant or changing speeds. A computer control system which monitors inter stage temperature and pressure can be used to achieve best efficiency by altering the flow rate through each valve individually.

Figure 18:
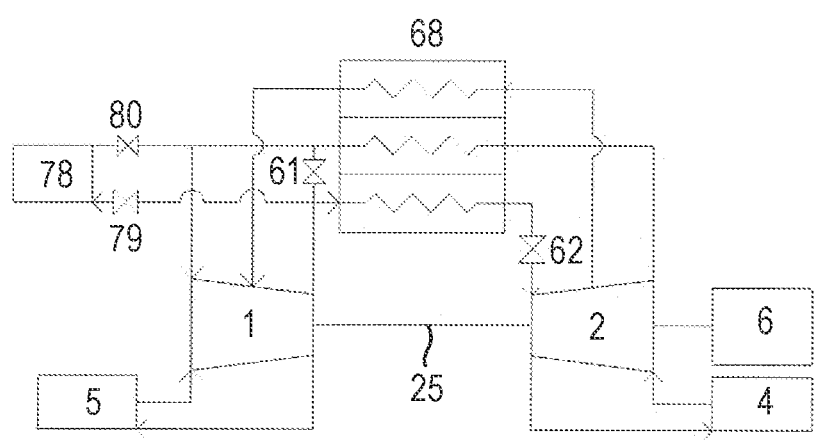
FIG. 18 shows an example of a heat engine configuration which may include a compressor and/or turbine of the present disclosure.

FIG. 18 shows another alternative, where the latter stages of the compressor and early stages of the are optimised for higher mass flow rates. Again, control valves (not shown but similar to FIG. 4) are used to control the machine power. In any of these arrangements the heat exchanger can be split (i.e. provided separately) or combined (i.e. provided as one unit).

An alternative method for controlling the power output of the machine is to alter the working pressure. This can be achieved by adding a pressurised working fluid reservoir 78, and two control valves 79, 80 as shown in FIG. 18. High pressure fluid can be removed from the working fluid volume by opening valve 79. If can be returned to the system at a lower pressure by opening valve 80. Changing the mass of the working fluid in the same volume changes the pressure in the system, which changes the power output of the machine. If the fluid reservoir is large enough it can also be used to start the machine by opening valve 79. If required, a line connecting the fluid reservoir to the turbine nozzles can be included for this purpose, with an additional isolation valve.

This design can incorporate more than a single control loop. Additional control valves and pipework can be added to give multiple paths (e.g. three flow paths) that can be used to transfer fluid from the compressor to turbine in between different machine stages.

The closed cycle heat engine according to the present disclosure may not be not self starting. A motor can be connected to the shaft heat engine shaft 25. The motor can be electric, or of an impulse type turbine driven by an external compressed gas source. Where a generator is used, this can also be driven as a motor in order to start the turbine. When coupled into the shaft 25 with a mechanism which can provide torque in both rotational directions, the motor can also be used to provide low speed forward and reverse rotation of the turbine which can be used to turn the output shaft and associated equipment.

Turbine Module

Figure 24:
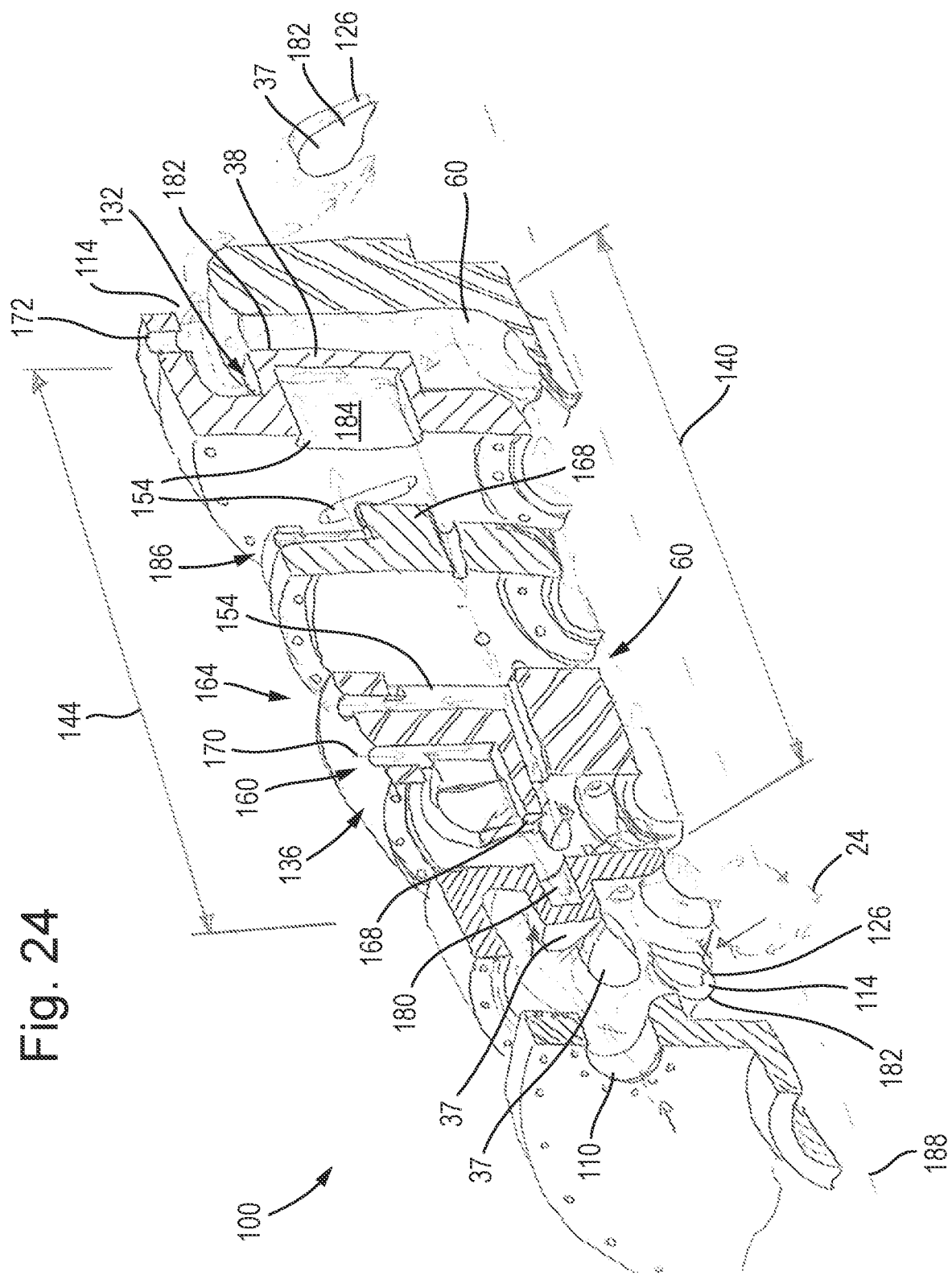
FIG. 24 shows a sectional perspective view of a turbine module according to the present disclosure.

A turbine module 100 for a heat engine 104 according to the present disclosure is shown in FIG. 24. The turbine module 100 defines a working fluid flow duct 60 between a turbine module inlet 110 and a turbine module outlet 114 configured to expand a working fluid, and hence remove energy from the working fluid, as the working fluid passes along the working fluid flow duct 60. The path defined by the working fluid flow duct 60 is shown by dotted arrows in FIG. 24. The turbine module 100 comprises a first heat exchanger 37 and a turbine rotor stage 24 centred on a first rotational axis 188. The turbine rotor stage 24 is rotatable around the first rotational axis 188. The first heat exchanger 37 may be non rotatable around the first rotational axis 188. Each of the first heat exchanger 37 and turbine rotor stage 24 are provided in the working fluid flow duct 60. The turbine rotor stage 24 may be carried on a shaft 25, the rotor stage 24 and shaft 25 being rotatable together around the first rotational axis 188.

As shown in FIG. 24, the first heat exchanger 37 may be provided in flow series between the turbine module inlet 110 and the turbine rotor stage 24. The turbine stage 24 may be provided in flow series between the first heat exchanger 37 and the turbine module outlet 114.

The first heat exchanger 37 may be defined by a wall 126 having an external surface 182 which is located in the working fluid flow duct 60.

Also shown in FIG. 24 is a heat supply unit 136 (which may also be termed a heat transfer unit) which defines a portion 140 of the working fluid flow duct 60 in flow series between the turbine rotor stage 24 and turbine module outlet 114. That is to say, a portion 140 of the working fluid flow duct 60 extends along/through the heat supply unit 136 to the turbine module outlet 114. The heat supply unit 136 is fixed to the first heat exchanger 37 and is also non rotatable around the first rotational axis.

Hence the working fluid flow duct 60 of the turbine module 100 extends so as to direct working fluid through the turbine rotor 24 and then along the length of the heat supply unit 136 before being delivered to the compressor module outlet 214.

The first heat exchanger 37 is in heat transfer communication with the heat supply unit 136.

The first heat exchanger 37 is configured such that it is operable to transfer heat received from the heat supply unit 136 to the working fluid 150 passing through/over the first heat exchanger 37.

As shown in FIG. 24, the first heat exchanger 37 may be provided as an aerofoil, for example a stator vane. Hence the first heat exchanger 37 may be provided as a nozzle guide vane 120.

The turbine stage may comprise a plurality of first heat exchangers 37 and a plurality of second heat exchangers 38. For example, the heat exchangers may be arranged in a ring, or provided as an array, around the first rotational axis 188, equally spaced apart from one another.

The heat supply unit 136 may defines a heating medium flow passage 154 (i.e. heat transfer fluid passage 154) for the transfer of a heating medium (i.e. heat transfer fluid) 170. The path defined by the heating medium flow passage 154 is shown by solid arrows in FIG. 24. The heat supply unit 136 may define a first inlet 160 to the heating medium flow passage 154 and an outlet 164 from the heating medium flow passage 154. The inlet 160 may be configured to receive the heating medium 170 (heat transfer fluid) from a heat source 174.

A second heat exchanger 38 may be located in the heat supply unit in the working fluid flow duct 60 in flow series between the turbine rotor stage 24 and the turbine module outlet 114.

Figure 6:
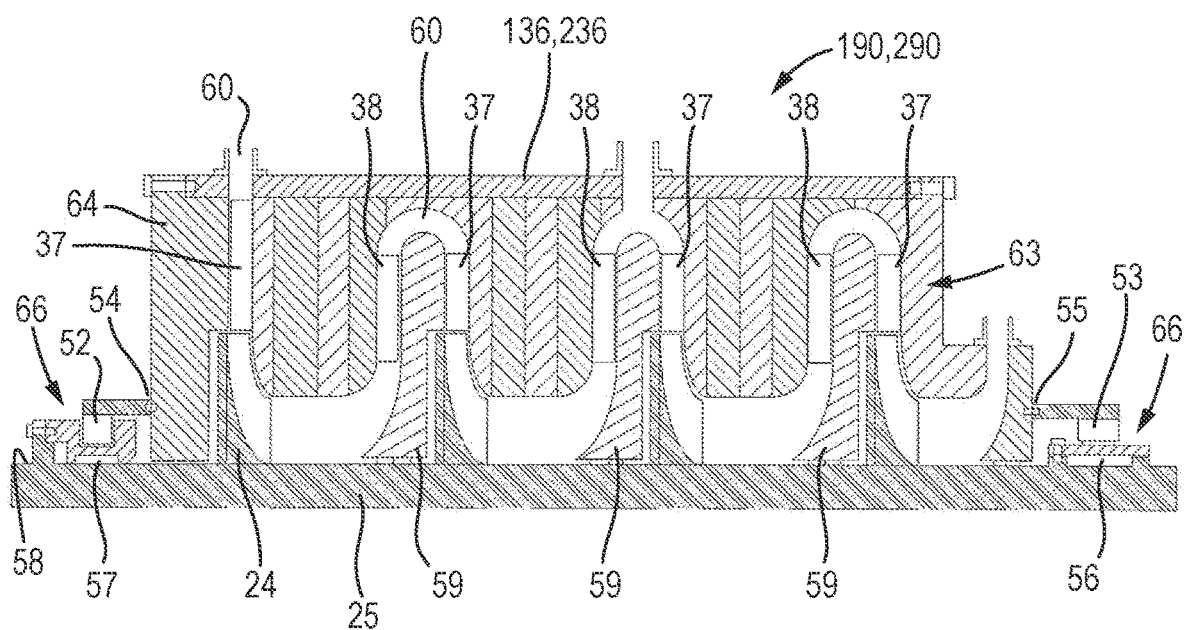
FIG. 6 shows a cross-section of a compressor or turbine system comprising a plurality of compressor or turbine modules as shown in FIG. 5 and according to the present disclosure.
Figure 14:
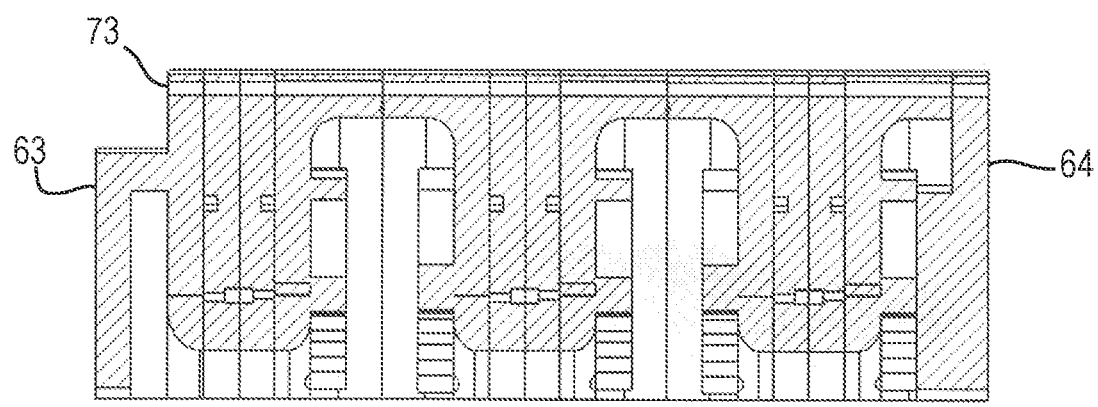
FIG. 14 shows a cross-section of a compressor or turbine system according to the present disclosure.
Figure 15:
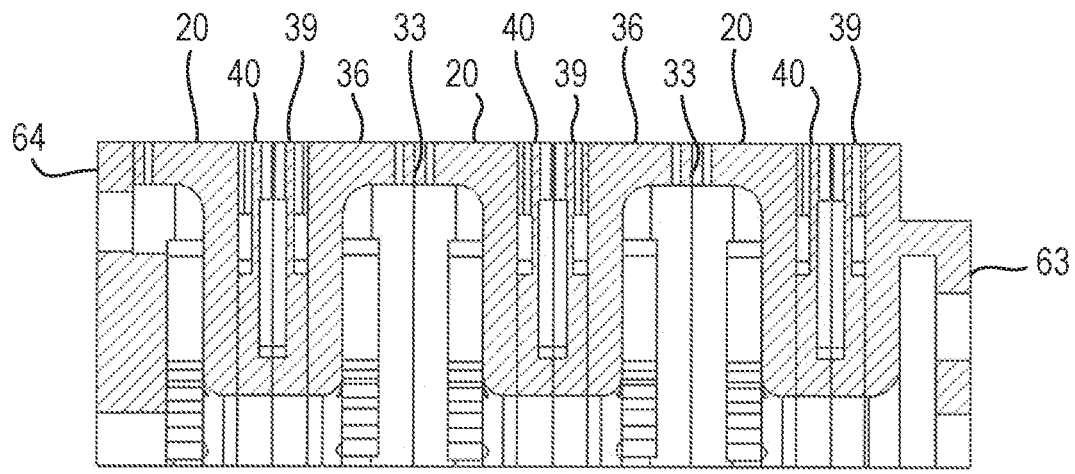
FIG. 15 shows a cross-section of a compressor or turbine system according to the present disclosure.

The second heat exchanger 38 may be provided adjacent to the turbine module outlet 114. The second heat exchanger 38 may be defined by a wall 132 having an external surface 182 which is located in the working fluid flow duct 60. The second heat exchanger 38 may be configured such that it is operable to transfer heat to the working fluid 150 passing through, over (i.e. past the second heat exchanger 38). The second heat exchanger 38 may thus provide reheat inter stage heating in examples in which multiple turbine modules are assembled. That is to say, there may be provided a turbine assembly 190 comprising multiple turbine modules 100 as herein described, aligned in sequence such that the working fluid flow duct 60 extends from the inlet 110 of the first module in the sequence to the outlet 164 of the last module of the sequence (for example as shown in FIGS. 6, 14, 15). There may thus be provided a thermodynamic apparatus (i.e. heat engine) comprising a turbine module 100 as herein described a turbine assembly as herein described.

Still with reference to FIG. 24, the heat supply unit 136 may define a flow port 172 in fluid communication with the working fluid flow duct 60 and in flow series between the second heat exchanger 38 and the turbine module outlet 114. The flow port 172 provides a means for adding additional working fluid to, or removing working fluid from the working fluid flow duct 60.

The heating medium flow passage 154 may comprise a portion 144 which extends adjacent to the portion 140 of the working fluid flow duct 60 as it extends along/through the heat supply unit 136 along the rotational axis 188. The body of the heat supply unit 136 which defines the working fluid flow duct portion 140 and heating medium flow passage portion 144 may be configured such that it is operable to transfer heat from the heating medium 170 to the working fluid 150.

The wall 126 of the first heat exchanger 37 may comprise a cavity 180 which defines part of the heating medium flow passage 154. A flow baffle member 168 may be provided in the first heat exchanger cavity 180 and/or second heat exchanger cavity 184.

The wall 132 of the second heat exchanger 38 may comprise a cavity 184 which defines part of the heating medium flow passage 154.

The heating medium flow passage 154 may be isolated from the working fluid flow duct 60 such that the heating medium 170 does not come into direct contact with the working fluid 150.

The heat supply unit 136 may define a second inlet 186 to the heating medium flow passage 154. The first inlet 160 is spaced apart from the second inlet 186 along the length of the heat supply unit 136. The heater outlet 164 is provided between the first inlet 160 and the second inlet 186 along the length of the heat supply unit 136 such that heating medium entering the inlets 160, 186 are exhausted via the outlet 164.

Hence there is provided equipment for providing interstage heating by means of a heat exchanger within a gas turbine, resulting in heating of the gas at a near constant pressure between stages. This gives increased efficiency. In the examples shown a radial gas turbine is illustrated, although the invention could equally be applied to an axial flow gas turbine.

As described above, the turbine may use a heating fluid (heating medium or heat transfer fluid) and a working fluid. The working fluid may be a compressible fluid, and the heating fluid (heating medium or heat transfer fluid) can be a compressible fluid or an incompressible fluid.

Figure 5:
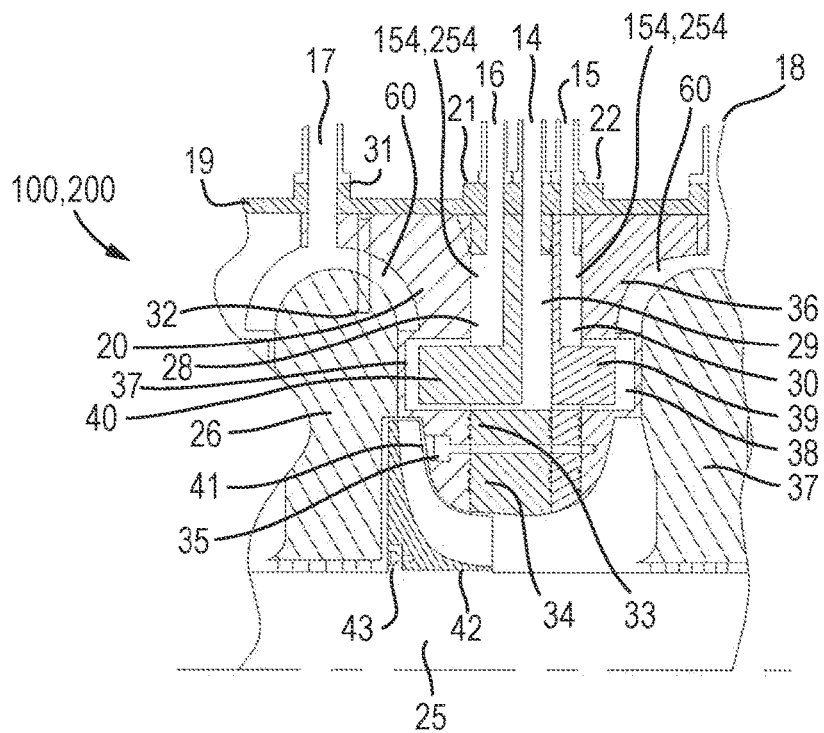
FIG. 5 shows a cross-section of a compressor or turbine module according to the present disclosure.
Figure 8:
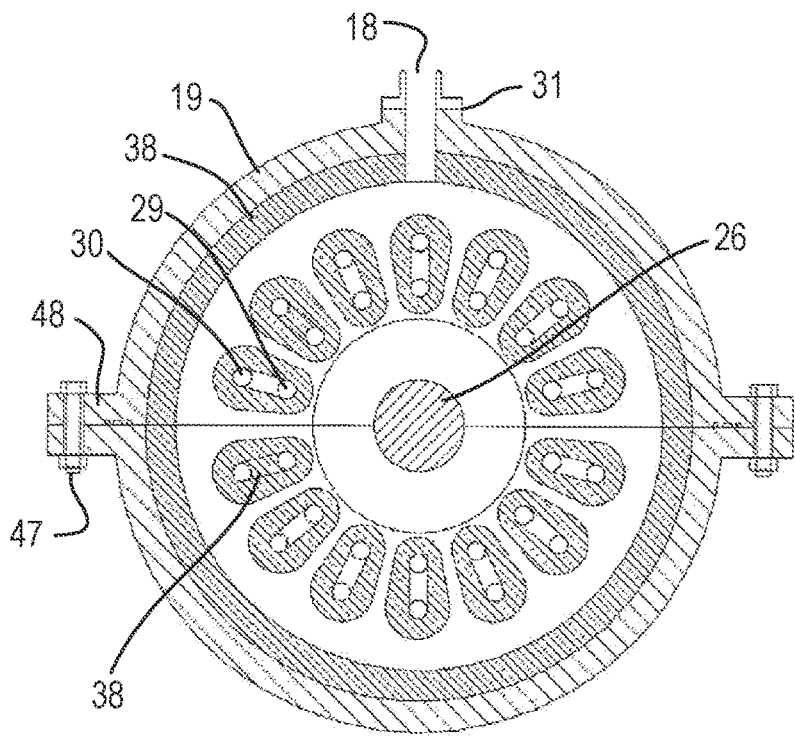
FIG. 8 shows a sectional view of an example of an outlet of the turbine module or inlet to the compressor module.

The arrangements shown in FIGS. 5, 6 and 8 present alternative examples of the arrangement shown in FIG. 24, although operates on the same principle, namely integrating a heat exchanger 38 which heats up the gas in between turbine stages. The working fluid passes from the exit (i.e. outlet) of one stage of the turbine, through a shaped channel 60 (working fluid flow duct) which forms the working gas side of the heat exchanger 38. The channel/duct is shaped to maximise heat transfer from the wall of the inner cylinder define by the heat supply unit 136 to the working fluid, whilst minimising pressure drop. Any number of channels, from one to many thousands can be used. These can be shaped using simple shapes, or with more complex machined T shapes, or with fins to increase the heat transfer surface area (not shown).

In the examples shown, the inter stage heat exchanger of the heat supply/transfer unit 136 includes a heater fluid channel (i.e. a heat transfer fluid or heating medium flow passage 154), which is formed from a machined inner cylinder plate 20, and a second machined inner cylinder plate 40. Plate 20 is machined to create the required working fluid channel shape on the working fluid side, with shaped hollow slots on the opposite face which allow the heating fluid (i.e. heating medium or heat transfer fluid) to pass through the heater channels in the rotor blades, allowing heat to transfer from the heat transfer fluid to through the wall of the heat exchanger to the working fluid. The heat transfer fluid channels in plate 20 form the female part of the connection between plates 40 and 20.

The second inner cylinder plate 40 defines the baffle 168, 268 providing an arrangement of channels which allow for the heater fluid to be passed to one end of the heater channel, and a set of upstanding machined fluid guide shapes 69 which slot into the hollow section of plate 20. These form the second, male part of the heater fluid channel. The second inner cylinder plate 40 has a set of drilled holes and channels machined into it, forming the heat transfer fluid flow passage 154, to allow the heater fluid to pass through it, and return to the outlet from the turbine.

A large number of heat exchanger channels of complex shapes can easily be manufactured in this arrangement, increasing the surface area with little cost. A multi axis CNC mill can produce these shapes accurately and quickly. The inner cylinder plates can be machined from solid plate material, or from cast or forged blanks of a similar shape to the final design. Alternatively each of the plates of the heat supply/transfer unit 136 can be manufactured using additive manufacture methods (3D printing). The heat transfer fluid is forced through the heater channel by means of a pump providing a pressure difference between the supply to the turbine 15 and the return 14 (as shown in FIG. 5).

Figure 9:
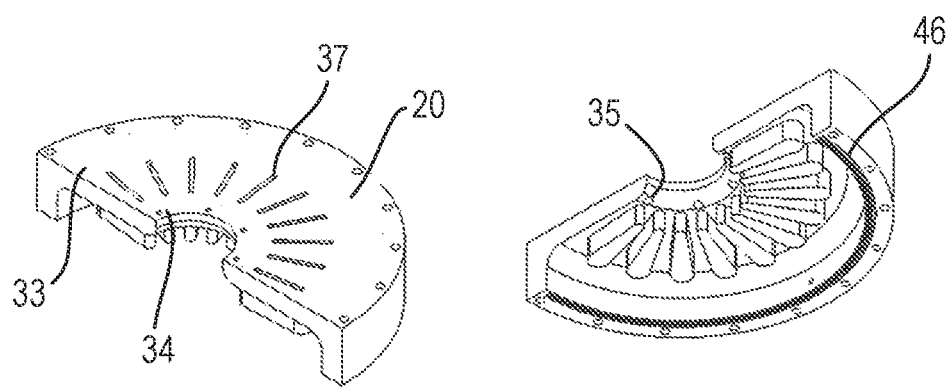
FIG. 9 shows a perspective view of different sides of part of an example compressor module inlet or turbine module outlet which may be configured for interstage heat transfer (i.e. cooling or heating)
Figure 10:
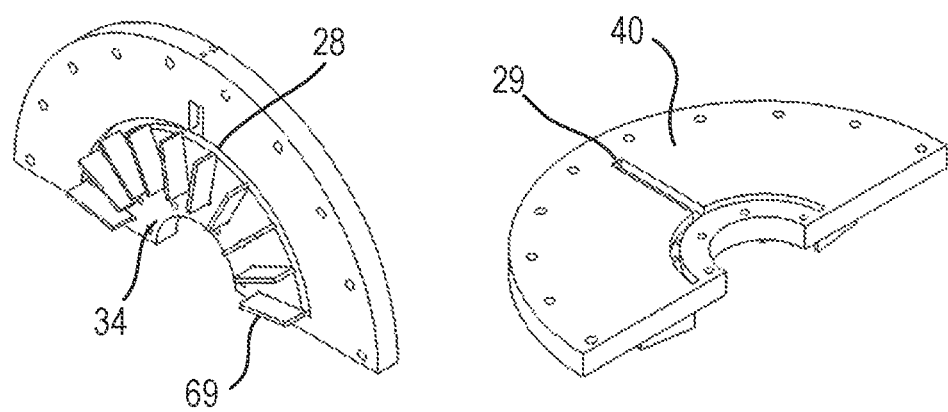
FIG. 10 shows a perspective view of different sides of part of another example of a compressor module inlet or turbine module outlet control of fluid flow path.

A heating fluid sealing arrangement is created by pre-tensioned bolts clamping the two plates together. A seal arrangement is shown in FIGS. 5 and 9 (features 33, 34 & 46) which has a primary seal seated in a machined groove, a leak path which allows for leaks to be detected and the fluid to be collected and a secondary seal. The seals in the turbine can be of metal construction (due to the high temperature) and could be metallic c seals, spring backed metallic c seals or o seals. Alternatively, the seals can be created by a simple metal to metal joint, created by a machined raised face on each plate being clamped with enough pressure by the bolts to create a tight seal.

The working fluid sealing arrangement is achieved in the same manner, using the same bolts or a different set to provide the clamping force. The grooves are machined into the plates using a CNC milling machine. The outer cylinder sealing arrangement is also achieved in this manner. The plates can also be sealed by a seal weld around the outer edge if required.

Alternatively the entire plate structure formed by plates 20, 36, 39 and 40 can be manufactured using additive manufacturing (3D printing).

FIGS. 5, 6, 7 and 8 show the arrangement of the casing, including a two part outer cylinder 19. The two parts bolt together via a machined surface which either forms or contains seals. This cylinder houses the inner cylinder and diaphragm plates. Pressure resistant end plates 63, 64 have a bolted connection to the outer cylinder 19, and a sealing arrangement similar to that described below and previously. The inner cylinder parts can be connected to the outer cylinder with a bolting arrangement, with a set of keys, or through the fluid path inserts 67 used to form the mechanical connection part of the sealing arrangement shown in FIG. 11.

The turbine has to have a hot shaft due to its working environment. This allows for reduced temperatures at the bearings, which allows conventional bearings to be used with lower oil flow rates, and lower cooling requirements.

FIG. 6 shows a method of providing thermal insulation to the bearings, limiting the amount of heat which is transferred from the hot turbine rotor to the bearing. Thrust and radial bearings 52, 53 may be oil film hydrodynamic or rolling element bearings. The turbine housing may comprise a keyed connection 54, 55. The keys 54, 55 allow radial growth of the turbine housing relative to the bearing housing. A minimum of three radial keys are required to support the bearing, however more can be used. Air gap 56, 57 are provided between the bearing support surfaces 65, 66 and the rotor. The bearing support surface provides structural support, transferring the axial and radial loads from the bearing and bearing housing to the rotor. The rotor has a reduced contact area with the bearing support surfaces, created through a machined surface on both items. Item 58 provides an axial restraint to the thrust bearing support. This can be arranged as shown or fitted from the opposite end to allow installation as required.

Figure 7:
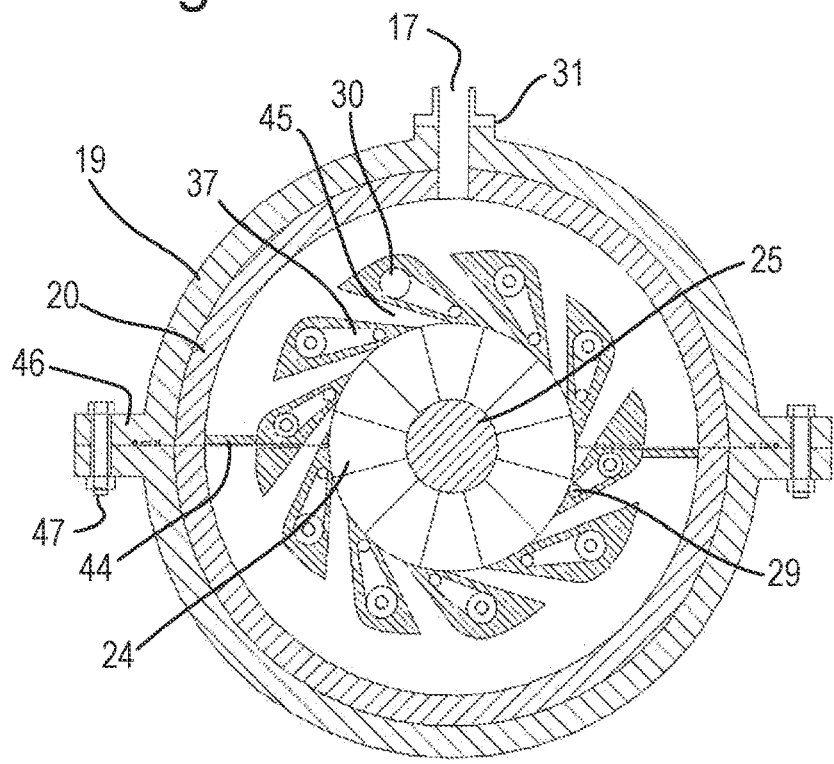
FIG. 7 shows a sectional view of an example of an inlet to the turbine module or outlet of the compressor module.

The efficiency of the first stage of the turbine can be maintained through the use of a partitioned turbine inlet volume. In this instance, a number of valves would replace the control valve 9, which independently allows the working fluid to enter only a set area of the turbine nozzles. FIG. 7 shows how this would be split using a separation plate 44. Only one inlet is shown in FIG. 7, but an inlet similar to 18 would be added to the lower section of the turbine in this arrangement. Multiple similar arrangements can be used to split the turbine inlet into many sections.

Figure 11:
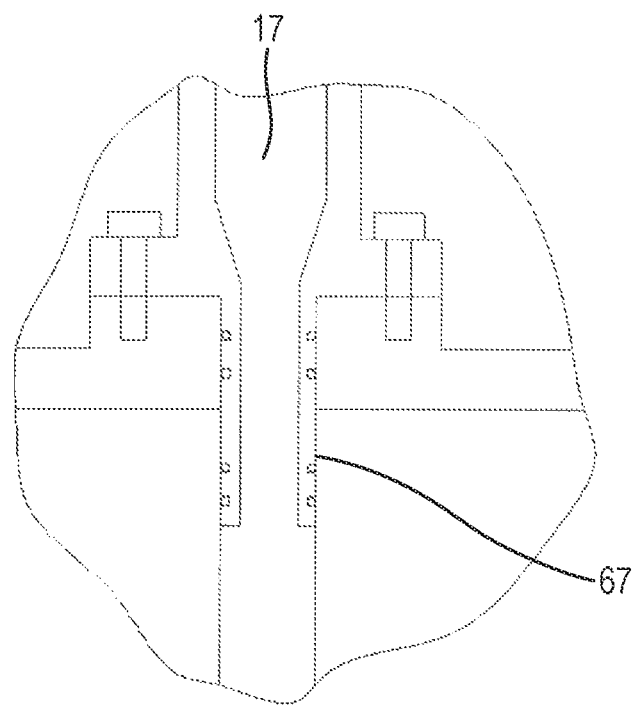
FIG. 11 shows an enlarged view of an inlet port shown in FIGS. 7, 8.

Pressure sensors can be inserted into the working fluid through a similar sealed arrangement to the medium pressure inlet 17 (as shown in FIGS. 7, 11) and cylinder seal insert 67. A pitot tube can be used. Thermocouples can also be inserted into the working space through sealed inserts in this manner. Drains can be placed at the bottom of the turbine cylinder using a similar arrangement to allow condensation and lost fluid to be removed from the working fluid space.

The inner casing plates can be combined with the end plates directly, removing the need for the outer cylinder to retain pressure loads. The plates can be clamped together to provide the required sealing pressure using a single set of long bolts which run through all of the plates outside the seals. The structural support and alignment of the plates is provided by alignment bars, which also run through all of the individual plates. FIG. 14 shows a cross section sketch through the alignment bar hole 73 of this arrangement. The bolt holes are similar to the alignment bar holes. FIG. 15 shows a cross section of the turbine or compressor cylinder, on the machine centre line.

A design of sealing the working fluid, heater fluid and cooler fluid within the turbine casing is shown in FIG. 9, comprising a primary and secondary seal made of an O ring, metallic C seal or spring backed metallic C seal form a boundary to restrain the flow of material to the desired area of the machine. A drain line is machined into the plate or structure surface, which highlights when a seal is passing fluid. This also allows for the fluid to be re-introduced into the machine. Pipe connection seals 21, 22 and 23 can also be manufactured in this manner, or alternatively they can use an arrangement shown in FIG. 11, or conventional bolted joints 31, gaskets or welds.

As described with reference to FIG. 24, there may also be provided first heat exchanges 37 at inlet to the turbine rotor heated nozzles which expand the working fluid and heat it at the same time (in a radial gas turbine). This expands and heats the gas at the same time, so the pressure drops through the nozzle whilst heat is added. This gives the nozzle a higher exit velocity for the same pressure drop. It improves efficiency in the impulse section of blading in a turbine. Heat is added directly to the turbine which makes the machine simpler and footprint smaller.

An arrangement of machined plates 20, 40 may be used to create the first heat exchanger 37, with a specific purpose of increasing the flow velocity of the working fluid using a pressure difference across the nozzle, whilst adding as much energy to the working fluid as possible by heating it. The shape of the nozzle working fluid channels 45 is optimised to use a pressure drop between the entrance to the nozzle and nozzle exit to increase the velocity of the working fluid, and add as much heat energy to the working fluid as possible at the same time. This creates a nozzle with near isothermal expansion.

The nozzle channel on the working fluid side may be machined into one face of the plate 36, and a hollow slot (making the female part of the heater fluid channel) is machined into the back face. The second plate 39 may include a set of machined channels to guide the fluid to one end of the heater channel and return it from the other end.

A similar heater fluid and working fluid seal arrangement is used between these plates as described previously. A minimum of a single stage is required for this to achieve an improved efficiency, but many can be used.

Figure 16:
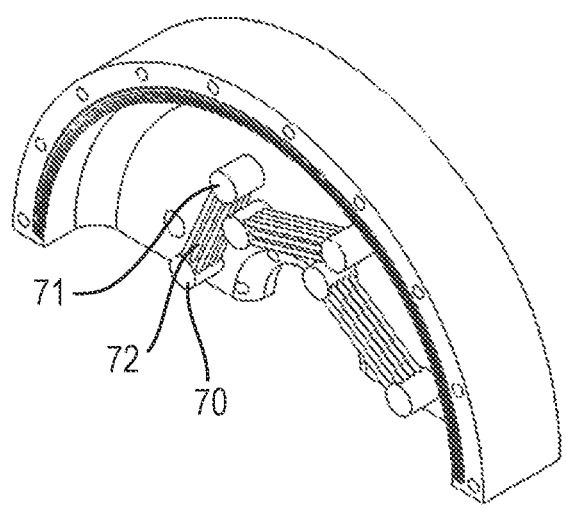
FIG. 16 shows a perspective view of a further example of a compressor module or turbine module inlet/outlet.

As shown in FIG. 16, an arrangement of supply manifold tubes 70 and return manifold tubes 71 can be connected to the inner cylinder plates. The plates provide a heater fluid supply and return path to the manifold tubes. Small diameter heat transfer tubes 72 connect the manifold supply and return tubes within the inter stage heating space, forming a heat exchanger. The manifold tubes can be connected to the supply and return section of the plate through a sealed bolted joint similar to item 67, or through a bolted or welded joint. As indicated below with reference to the compressor module, a similar arrangement can be used to provide inter stage cooling in a compressor.

Blade profiles can be impulse or reaction type blade stages depending on the desired machine operation profile. They can be primarily radial flow, primarily axial flow or a combination of both. Impulse type blading can give an advantage by allowing the heat transfer area to be external to the rotating components, meaning that the expansion or compression can be closer to isothermal, however this can also increase flow losses in the machine.

The turbine blades can be configured and shaped so that the flow passes axially through them, or in a combination of axial and radial directions.

Figure 17:
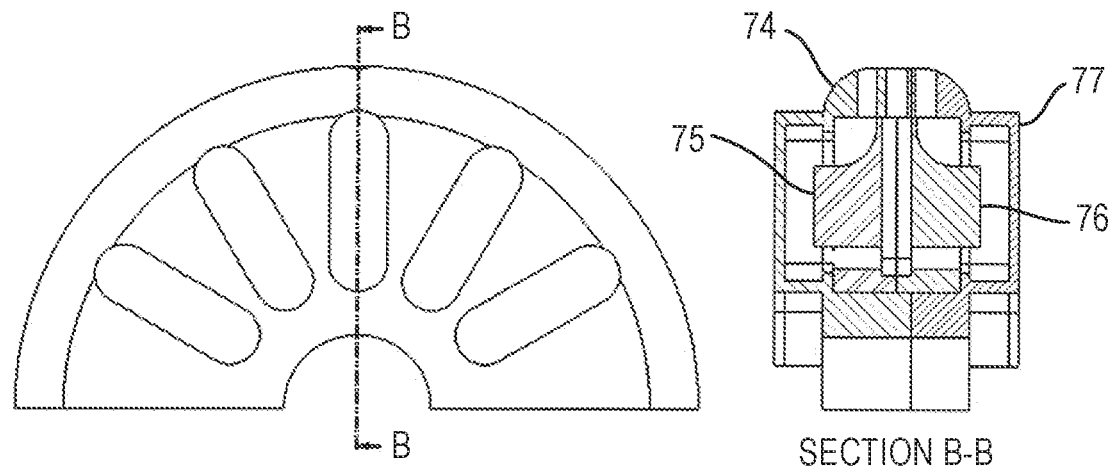
FIG. 17 shows a perspective view of an additional example of a compressor module or turbine module inlet/outlet.

FIG. 17 shows an alternative design for creating a diaphragm which provides inter stage heating, cooling, heated nozzles and cooled diaphragms. A similar arrangement of machined plates bolted together with a sealing arrangement similar to that described previously can be used to create the inner surface of the working fluid flow path. The surface can be shaped to form channels for the heater or cooler fluid, and to create a shape which maximises heat transfer between these fluids and the working fluid.

Each diaphragm plate 26, 27 shown in the example of FIG. 5 is replaced by diaphragm plates 74, 75, 76 and 77. The diaphragm support dowels 32 are aided in supporting the diaphragm by a set of supply and return heater and cooling connections which are similar in design to item 67, however they pass through the inner (and outer cylinder if present) and through the working fluid space, providing supply and return paths for the heater or cooler fluid and structural support.

The diaphragm is sealed in a similar manner to that described above, with the addition of a return path for the heater or cooler fluid. This path is provided by a similar design to the heater fluid supply.

Figure 19:
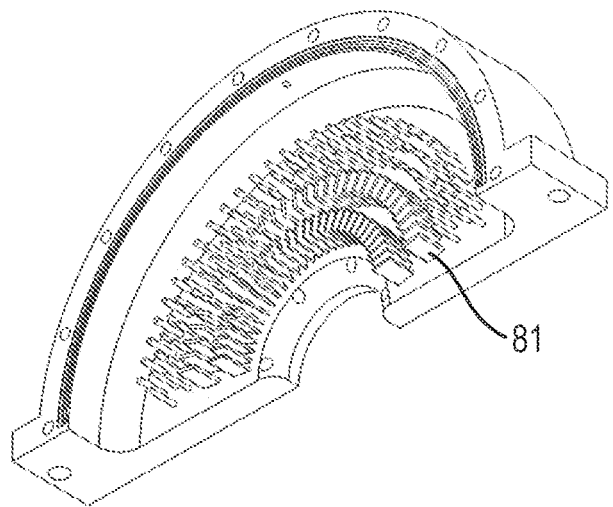
FIGS. 19 to 22 illustrate further examples of a compressor module or turbine module inlet/outlet.

The flow channels and shape of the working fluid heat transfer surface inter stage heater, cooler, the heated nozzle and the cooled diffuser can also be created with an arrangement of simple fins and shapes on the surface of the plates 81, as shown in FIG. 19. In this example this does not allow for the heating or cooling fluid channel to directly pass into the fins, however it does create a larger heat transfer surface. The fins can be machined into the plate or can be welded onto the surface of the plate using conventional methods including automated or manual drawn arc, short cycle or capacitor discharge stud welding type techniques.

Heating or cooling fluid flow channels are machined into the plates as described previously. The channels in the plates can also contain similar welded on features to create channel shapes which improve heat transfer and reduce friction.

Figure 20:
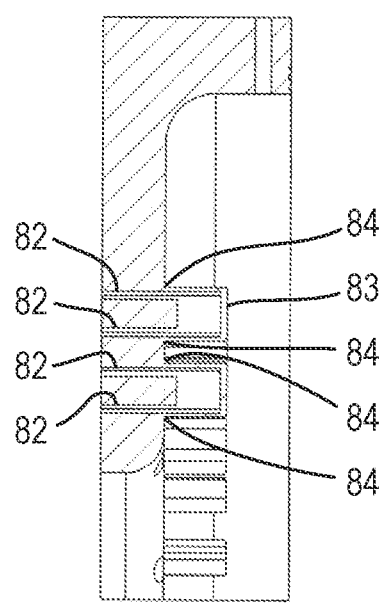

As shown in FIG. 20, the flow channels and shape of the working fluid heat transfer surface inter stage heater, cooler, the heated nozzle and the cooled diffuser can also be created with a separate hollow shaped fin component 83, which is welded over holes 82 in the plate, which allows the fluid to enter and return from the fin, creating a thin wall for improved heat transfer, whilst allowing a welded construction rather than machining the fins from a parent plate. The fins can be welded using conventional methods including automated or manual drawn arc, short cycle or capacitor discharge stud welding type techniques. The "Fin" component 83 can alternatively be a section of tube in a U shape, providing a supply and return connection.

Figure 21:
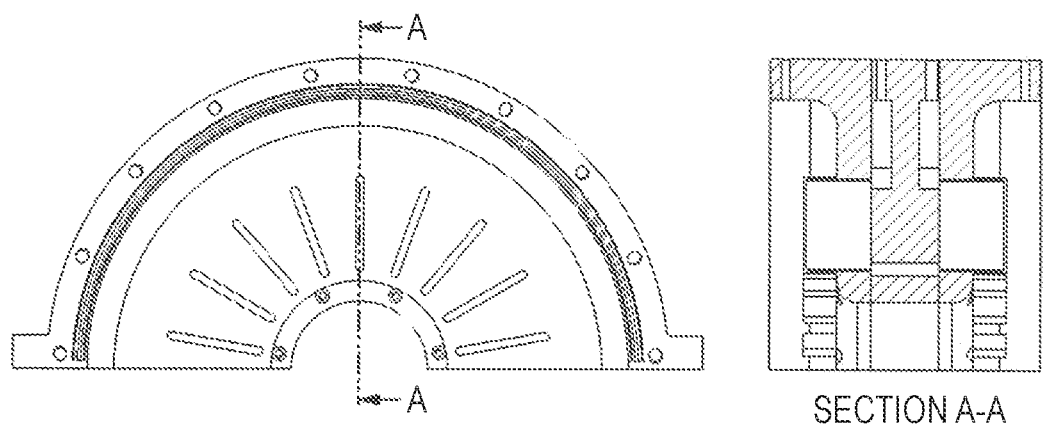
Figure 22:
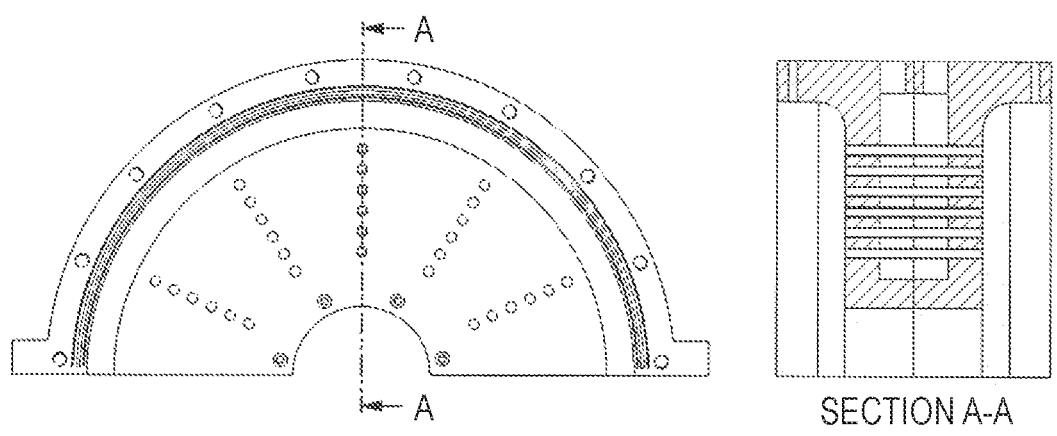

FIGS. 21 and 22 show additional or alternative interstage heater designs, with a 3 plate variant, and with a tube type arrangement where gas passes through the heater fluid as it passes through a tube bundle.

FIGS. 25 to 32 illustrate a further design variation of the apparatus of the present disclosure. In particular they illustrate features of a heat exchanger with a small number of sealed bolted joints and components, a method of supply and return of heating or cooling fluid between two heat exchanger casing components, and alternative assembly arrangements.

Figure 25:
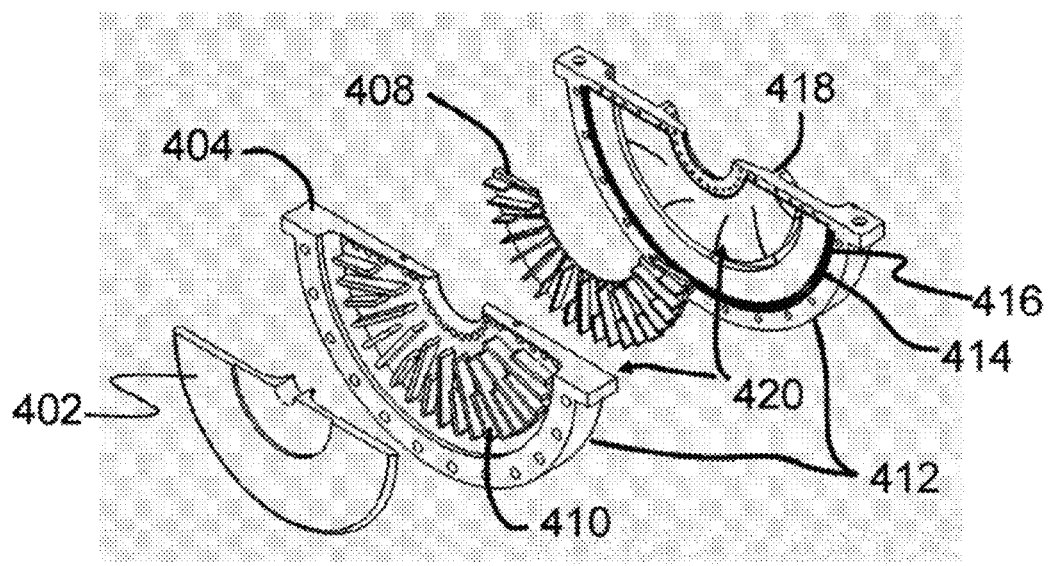
FIGS. 25 to 32 illustrate further example features of a compressor module or turbine module according to the present disclosure.

FIG. 25 shows machined inner casing plates 404, 418 used to create a single sealing face 416, which is clamped together using a bolted joint arrangement. Counter bored holes 414 allow for the bolted joints to fit within the section. Alternatively, a prepared seal weld around the outside face 412 can be used, similar to a V butt weld. Also illustrated is a diaphragm 402.

The internal surface/volume 420 of this pair of plates 404, 418 hold the heat transfer fluid, with a single sealing surface 416, rather than on multiple seal surfaces.

Figure 26:
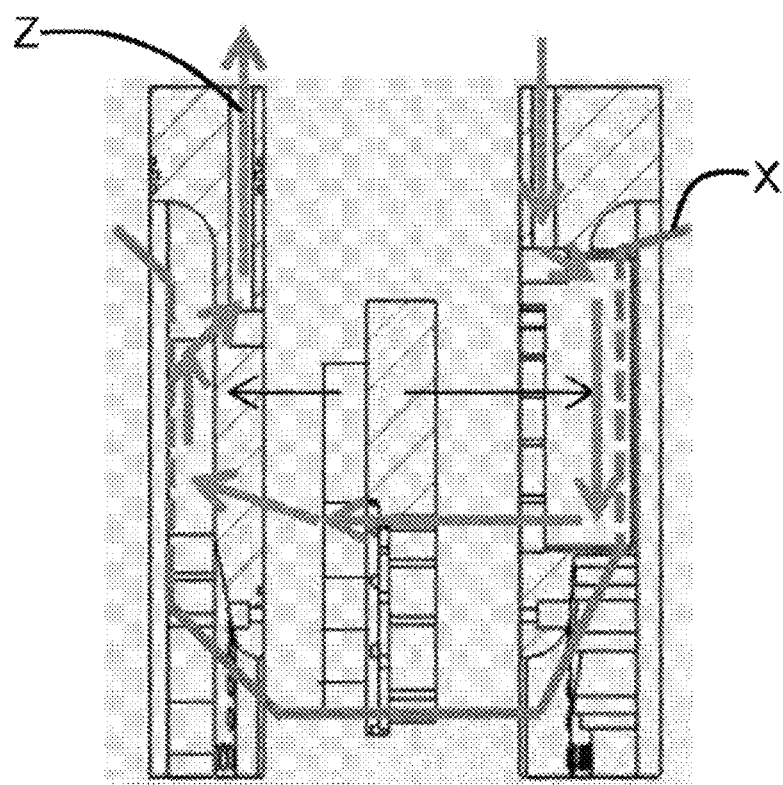

The two plates 404, 418 clamp around a flow path guide plate 408. This fits within the slotted holes which form the guides 410 (as shown in FIG. 26) and restricts the flow of the heat transfer fluid to the optimum path through the space. This can be made up from a single flat plate, with a number of slotted holes which a number of shaped guide plates fit into, or a single machined or 3D printed item. The two inner cylinder plates can be bolted or welded together.

When connected together these three plates 404, 408, 418 create a heat exchanger with the heat transfer fluid contained within the inner casing plates.

In FIG. 26 the supply and return of heat exchange fluid to this volume is shown by arrows "Z" in FIG. 26. The flow of the working fluid around the outside of the heat exchanger is shown in the dashed and solid line "X". The dashed sections show where the working fluid flows between the heat exchange surfaces.

Figure 27:
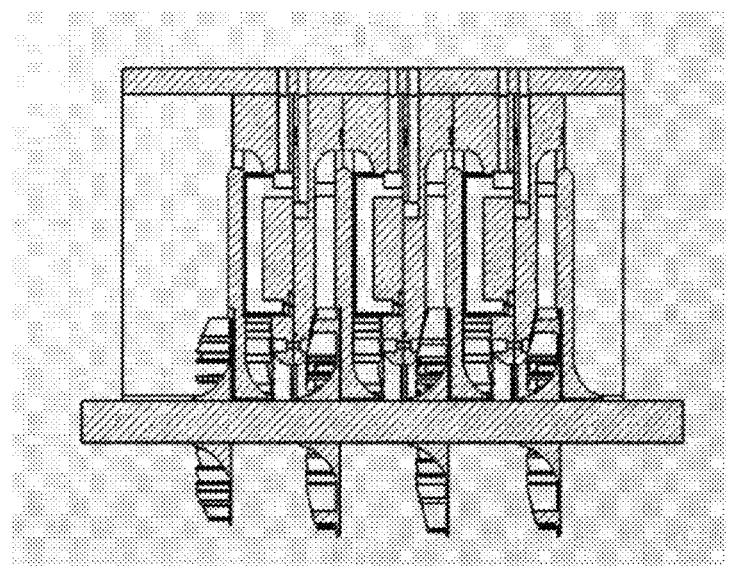

FIG. 27 shows an arrangement of a number of stages of the arrangement shown in FIGS. 25, 26, with the casing, rotor and blades. Supply and return connections are detailed for each heat exchange unit. The diaphragm 402 can be held in place with pins or clamped in place by the inner casing plates.

Figure 28:
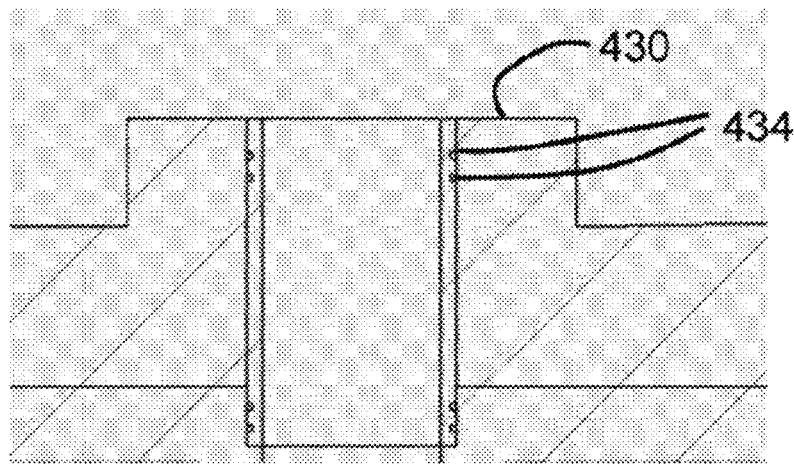

FIG. 28 illustrates example supply and return seals 434 that may be utilised. These are illustrated with sealing sleeve and standard flange joint 430. Metallic C seals, O seals and piston ring type seals may be provided.

Figure 29:
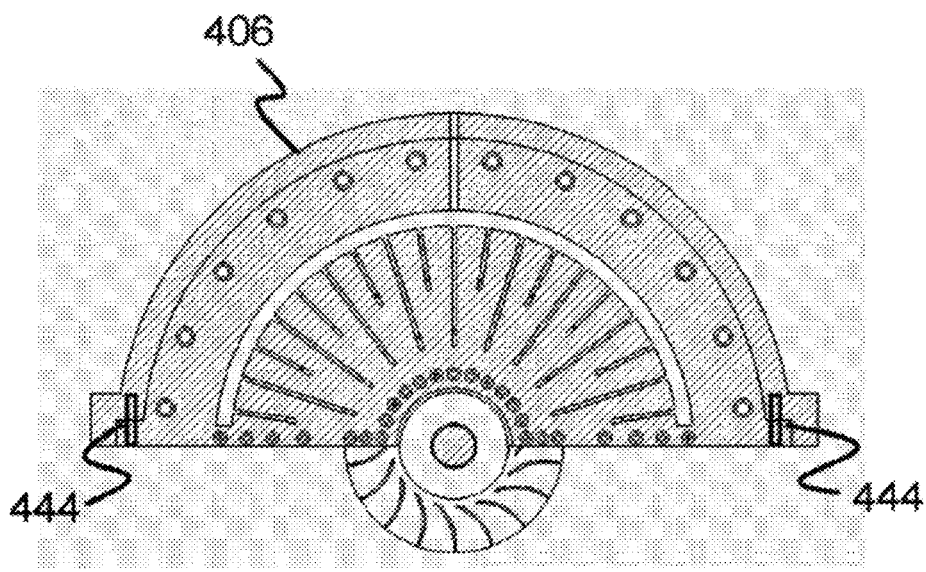

FIG. 29 shows an axial view of the example of FIG. 25 with a seal arrangement akin to that of FIG. 28 shown at top dead centre in FIG. 29. FIG. 29 illustrates vertical restraint of the plates 404, 418 within a casing via a key arrangement which can include bolts 444 which hold the inner casing plates 404, 418 to an outer casing 406. Horizontal restraint is provided via a sealing sleeve which performs a joint function of sealing and component restraint.

Figure 30:
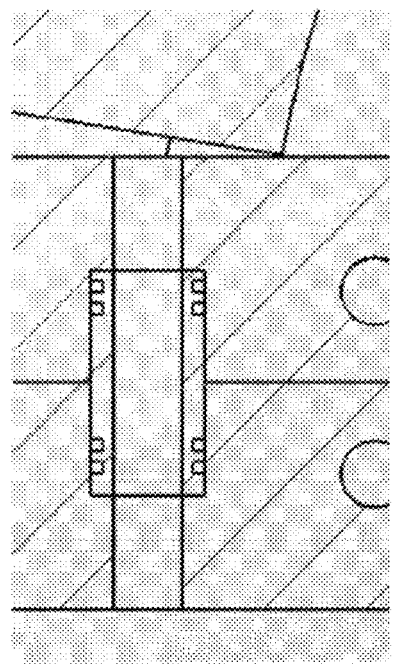

FIG. 30 illustrates a feature which enables top and bottom casing components to have linked heat transfer fluid paths between the top half to bottom half. This allows for supply of heat transfer fluid to the top of the machine, and a drain from the bottom if desired by design. A counterbored machined shoulder provides the restraint of the sealing sleeve components. A number of these can be used to provide a large area for passing fluid between the top and bottom parts.

Figure 31:
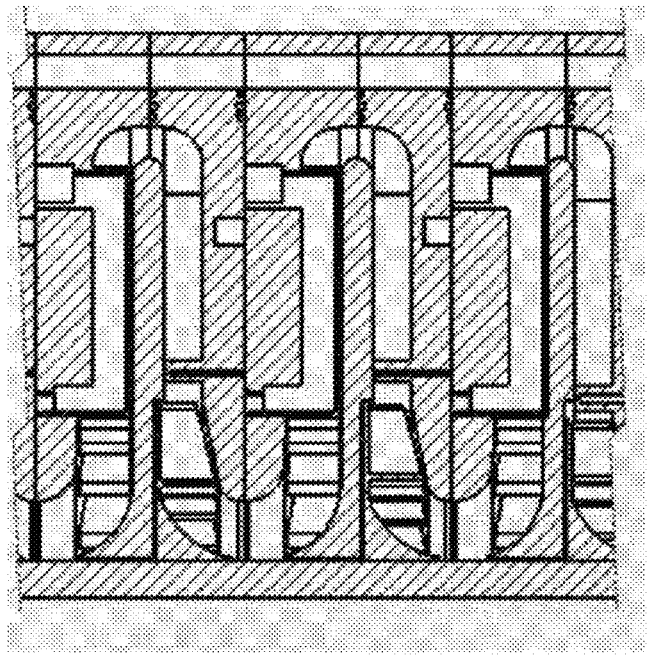

FIG. 31 shows an alternative arrangement, where there is no outer casing. An arrangement of long studs or bolts pass through all of the plates. Dowels which link the plate faces (in shear) allow for the casing to be accurately assembled without an outer casing, reducing the number of components further.

Figure 32:
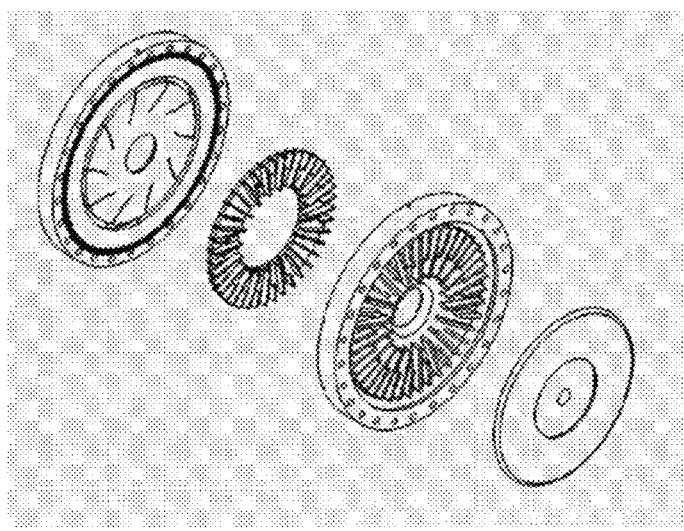

FIG. 32 shows a further example assembly, where the rotor and casing components are assembled axially, thereby allowing for fewer components to be used.

Gland or labyrinth type seals may be provided throughout the assembly to reduce losses due to fluid passing between the stages.

Valves may be provided to control the flow of fluid being supplied to the assembly, to the heat exchanger and from the heat exchanger drain.

The diaphragm 402 may be provided as the heat transfer component, employing a simpler arrangement requiring only two plates 404, 418.

Figure 33:
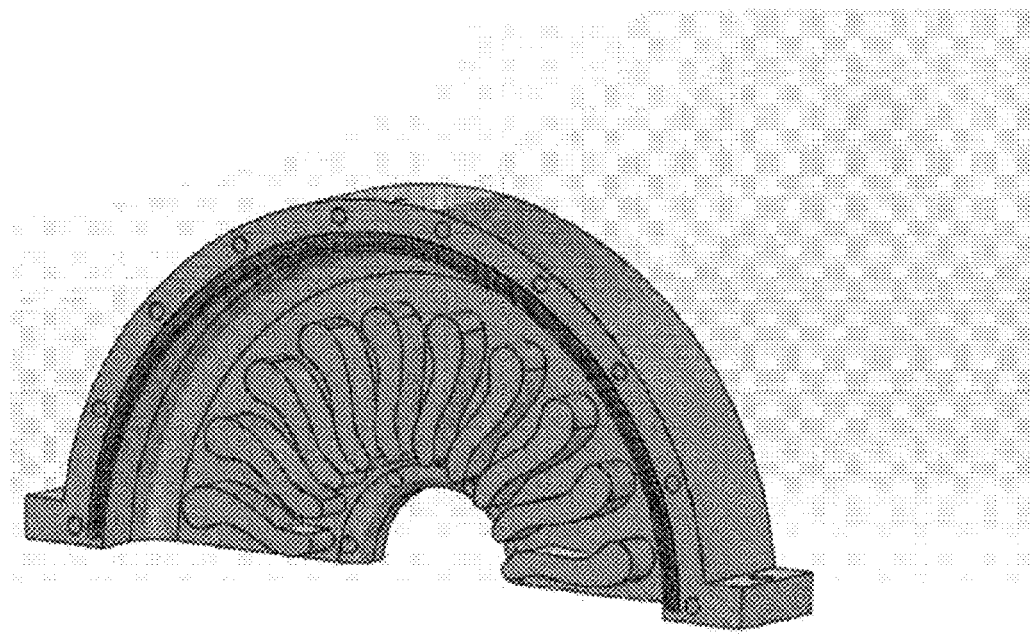
FIG. 33 shows a further alternative design feature according to the present disclosure.

FIG. 33 illustrates a further alternative feature, specific to a turbine module application. It may have particular efficacy in examples in which the heater/heat exchanger is working in a "wet steam" section of a turbine. The heat exchanger guides/vanes 37 may have an "S" shape as illustrated in FIG. 33. Adding "S" shaped curves to the heat exchange working fluid side, as shown, may result in any liquid in the gas being thrown onto a surface as it is more dense than the gas, which forms a film and increases the heat transfer coefficient, meaning that the heat exchanger can be smaller.

In such an application, the working fluid may be steam with less than 15% wetness, and the turbine module may comprise high chrome or stainless steels. The walls of the module may be especially thick in this example also, to allow for the extra wear which may be endured because of this mode of operation.

A turbine according to the present disclosure may be configured for condensing or super critical fluids as the working and heating fluids (see for example FIG. 23). The working fluids may be steam or high pressure CO2. The working fluid may be a gas, and the heat transfer fluid may be a fluid. In the example of FIG. 23, steam may be the working fluid and condensing steam may be the heater fluid (i.e. heat transfer fluid/medium).

Compressor Module

Figure 12:
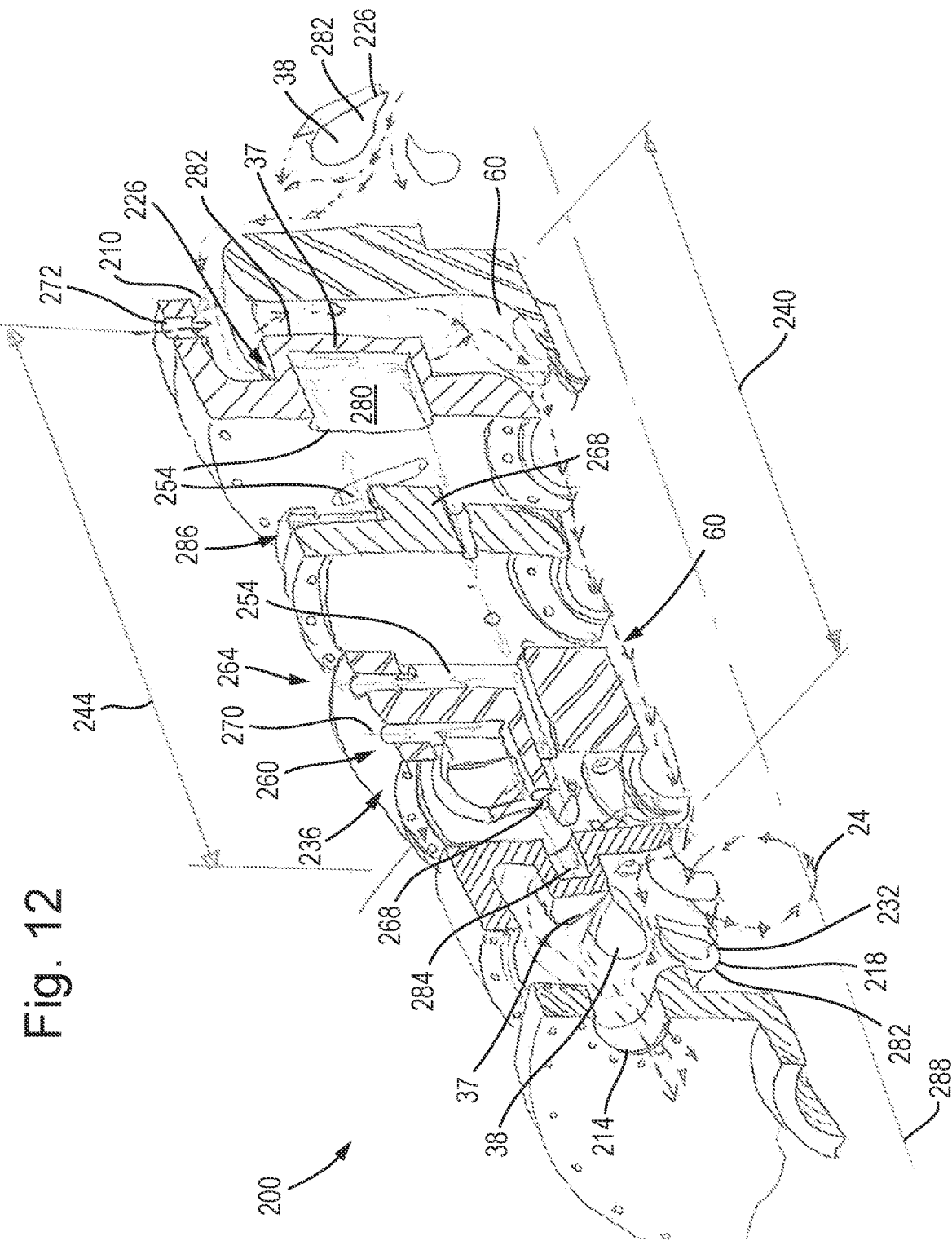
FIG. 12 shows a sectional perspective view of a compressor module according to the present disclosure.

A compressor module 200 according to the present disclosure, which may form part of the heat engine 104 according to the present disclosure, is shown in FIG. 12. As may be inferred from FIG. 12, the geometry of the compressor module of the present disclosure may be similar to the turbine module of the present disclosure. Although the geometries shown in FIGS. 24, 12 appear similar, it will be appreciated that the drawings are for illustration only, are not drawn to scale, and details of the compressor module and turbine module may be different to one another and vary to that presented.

In the example shown (e.g. a radial compressor) this configuration provides a cooled diffuser which slows, compresses and cools working fluid at the same time. Hence pressure increases through the diffuser at the same time as heat energy is removed.

The compressor module 200 defines a working fluid flow duct 60 between a compressor module inlet 210 and a compressor module outlet 214 configured to compress a working fluid, and hence add energy to the working fluid, as the working fluid passes along the working fluid flow duct 60. The path defined by the working fluid flow duct 60 is shown by dotted arrows in FIG. 12. The compressor module 200 comprises a first heat exchanger 37 and a compressor rotor stage 24 centred on a first rotational axis 288. The compressor rotor stage 24 is rotatable around the first rotational axis. The first heat exchanger 37 may be non rotatable around the first rotational axis 288. Each of the first heat exchanger 37 and compressor rotor stage 24 are provided in the working fluid flow duct 60. The compressor rotor stage 24 may be carried on a shaft 25, the rotor stage 24 and shaft 25 being rotatable together around the first rotational axis 288.

As shown in FIG. 12, the first heat exchanger 37 may be provided in flow series between the compressor module inlet 210 and the compressor rotor stage 24. The compressor stage 24 may be provided in flow series between the first heat exchanger 37 and the compressor module outlet 214.

The first heat exchanger 37 may be defined by a wall 226 having an external surface 282 which is located in the working fluid flow duct 60.

Also shown in FIG. 12 is a heat sink unit 236 (which may also be termed a heat transfer unit) which defines a portion 240 of the working fluid flow duct 60 (diffuser) in flow series between the compressor rotor stage 24 and compressor module inlet 210. That is to say, a portion 240 of the working fluid flow duct 60 extends along/through the heat sink unit 236 to the compressor module inlet 210. The heat sink unit 236 is fixed to the first heat exchanger 37 and is also non rotatable around the first rotational axis.

As will be noted, the direction of flow of the working fluid in the compressor module 200 is in the opposite direction to that of the turbine module 100 in FIG. 24. Hence the working fluid flow duct 60 of the compressor module 100 extends so as to direct working fluid along the length of the heat sink unit 236 before being delivered to the compressor rotor 24 and then the compressor outlet 214.

The first heat exchanger 37 is in heat transfer communication with the heat sink unit 236.

The first heat exchanger 37 is configured such that it is operable to transfer heat to the heat sink unit 236 from the working fluid 250 passing through/over the first heat exchanger 37.

As shown in FIG. 24, the first heat exchanger 37 may be provided as an aerofoil, for example a stator vane. Hence the first heat exchanger 37 may be provided as a compressor guide vane 220.

The compressor stage may comprise a plurality of first heat exchangers 37 and a plurality of second heat exchangers 38. For example, the heat exchangers may be arranged in a ring, or provided as an array, around the first rotational axis 288, equally spaced apart from one another.

The heat sink unit 236 may defines a coolant flow passage 254 for the transfer of a coolant 270. The path defined by the coolant flow passage 254 is shown by solid arrows in FIG. 12. The heat sink unit 236 may defines a first inlet 286 to the coolant flow passage 254 and an outlet 264 from the coolant flow passage 254. The inlet 286 may be configured to receive the coolant 270 from a heat sink (e.g. coolant source) 274.

A second heat exchanger 38 may be located in the heat sink unit in the working fluid flow duct 60 in flow series between the compressor rotor stage 24 and the compressor module exit 224.

The second heat exchanger 38 may be provided adjacent to the compressor module outlet 214. The second heat exchanger 38 may be defined by a wall 232 having an external surface 282 which is located in the working fluid flow duct 60. The second heat exchanger 38 may be configured such that it is operable to transfer heat to the heat sink unit 236 from the working fluid 250 passing through, over (i.e. past) the second heat exchanger 38. The second heat exchanger 38 may thus provide inter stage cooling in examples in which multiple compressor modules are assembled. That is to say, there may be provided a compressor assembly 290 comprising multiple compressor modules 200 as herein described, aligned in sequence such that the working fluid flow duct 60 extends from the inlet 210 of the first module in the sequence to the outlet 264 of the last module of the sequence. There may thus be provided a thermodynamic apparatus (e.g. heat engine or heat pump) comprising a compressor module 200 as herein described a compressor assembly as herein described.

The heat sink unit 236 may define a flow port (i.e. a second inlet/outlet port) 272 in fluid communication with the working fluid flow duct 60 and in flow series between the first heat exchanger 37 and compressor module inlet 210. The flow port 272 provides a means for adding additional working fluid to, or removing working fluid from, the working fluid flow duct 60.

The coolant flow passage 254 may comprise a portion 244 which extends adjacent to the portion 240 of the working fluid flow duct 60 as it extends along/through the heat sink unit 236 along the rotational axis 288. The body of the heat sink unit 236 which defines the working fluid flow duct portion 240 and coolant flow passage portion 244 may be configured such that it is operable to transfer heat to the coolant 270 from the working fluid 250.

The wall 226 of the first heat exchanger 37 may comprise a cavity 280 which defines part of the coolant flow passage 254. A flow baffle member 268 may be provided in the first heat exchanger cavity 280 and/or second heat exchanger cavity 284.

The wall 232 of the second heat exchanger 38 may comprise a cavity 284 which defines part of the coolant flow passage 254.

The coolant flow passage 254 may be isolated from the working fluid flow duct 60 such that the coolant 270 does not come into direct contact with the working fluid 250.

The heat sink unit 236 may define a second inlet 260 to the coolant flow passage 254. The first inlet 286 is spaced apart from the second inlet 260 along the length of the heat sink unit 236. The heater outlet 264 is provided between the first inlet 286 and the second inlet 260 along the length of the heat sink unit 236 such that coolant entering the inlets 260, 286 are exhausted via the outlet 264.

The diffuser section (heat sink unit) may comprise an arrangement of sealed plates as shown, by way of non limiting example, in FIGS. 5, 6, 14, and 15 with reference to the turbine module. More generally, features shown in FIGS. 5 to 11, 14 to 17, 19 to 22, 25 to 32 with respect to the turbine module may equally be used in the compressor module 200. Hence, for example, instead the arrangement in the turbine module 100 in which heat exchangers 37, 38 are provided which heat up (i.e. provide heat to) working fluid, the compressor module 200 provides heat exchangers 37, 38 which are operable to cool down (i.e. remove heat from) a working fluid. In practice rotor blades of the compressor may differ to rotor blades of the turbine. Also instead of the heat transfer fluid being a heating fluid/medium used in the turbine module, the heat transfer fluid may be provided as a coolant for use in the compressor, and hence instead of the arrangement in the turbine in which heat flow is from the heat transfer fluid to the working fluid, in the compressor module the heat flow is from the working fluid to the coolant. Thus the heat transfer fluid flow passage 154 of the turbine is termed a coolant passage 254 in the compressor, and the features that provide the heat supply unit 136 of the turbine are configured as a heat sink unit 236 for the compressor. Likewise it will be appreciated other heat related turbine terminology may be replaced with cooling related compressor terminology to provide the cooled compression functionality.

As described above in relation to FIG. 12, the direction of flow of the working fluid in the compressor module 200 is in the opposite direction to that of the working fluid in the turbine module 100 in FIG. 24. Hence although the features shown in FIGS. 5 to 11, 14 to 17, 19 to 22, 25 to 32 with respect to the compressor module 200 will be arranged as in the turbine module 100, the function and mode of operation of the features are configured to provide the compression and cooling function as described in relation to the compressor module 200 example of FIG. 12.

The purpose of the diffuser is to slow the high speed flow at the exit of a compressor stage, whilst removing as much energy from the working fluid as possible by cooling it. This feature lets the compressor arrangement approximate isothermal compression. Removing heat from the working fluid as it increases in pressure in the diffuser increases the efficiency of the compressor as described previously. A minimum of a single stage is required for this to achieve an improved efficiency, but many can be used.

The compressor module of the present disclosure may be configured for gas (i.e. air) storage and/or supply, providing an alternative to conventional compressor systems in may filed enhancement engines, machines and pipelines, process industry etc.

The machine arrangement can be completed by using more than a single shaft. The compressor can be driven independently from an external power source, or driven from the turbine shaft by a gearbox, belt drive, bevel gear or chain drive. The turbine or compressor component can also be split into two or more different machines. The compressor shaft can be attached to the turbine shaft by a flexible coupling.

The turbine module and compressor module of the present disclosure may increase the thermal efficiency of a heat engine in which they are included over currently available systems and has reduced requirements for space and supporting systems over conventional power generation equipment having similar thermal efficiency. This has the effect of making equipment of the present disclosure cheaper than the alternatives for the same power produced, giving a significant competitive advantage.

The apparatus of the present disclosure may be employed as constant speed machinery for electrical power production (for example where a heat source is created to drive a turbine). It may also be used in constant speed machinery for electrical power using fuels or heat sources. It may also have utility as variable speed machinery for marine propulsion, or turbine only machinery for extracting power from compressed gas.

Both electrical power production and the marine propulsion arrangements of apparatus of the present invention may provide benefit maritime applications by decreasing fuel consumption, and hence increasing the range or performance of vessels, by minimising the need for high pressure fluid pipework (making a safer product) and by simplifying the supporting systems required to operate the propulsion equipment (i.e. making cheaper and simpler design).

It may also find application in power production from any heat source (as described previously) including commercial power plants, traditional fossil fuel fired power stations, combined cycle power stations, geothermal power and automotive applications.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A compressor module, comprising:
an inlet and an outlet;
a working fluid flow duct between the compressor module inlet and the compressor module outlet;
a heat exchanger and a compressor rotor stage each in the working fluid flow duct, wherein the heat exchanger is in flow series between the compressor module inlet and the compressor rotor stage, and includes a wall having an external surface which is located in the working fluid flow duct, and wherein the compressor rotor stage is in flow series between the heat exchanger and the compressor module outlet; and
a heat sink unit which defines a portion of the working fluid flow duct in flow series between the compressor rotor stage and compressor module outlet;
wherein the heat exchanger is in heat transfer communication with the heat sink unit, such that the heat exchanger is operable to transfer heat to the heat sink unit from working fluid passing the heat exchanger;
wherein the heat sink unit defines a coolant flow passage for the transfer of a coolant;
wherein the heat sink unit defines a first inlet to the coolant flow passage, a second inlet to the coolant flow passage, and an outlet from the coolant flow passage, the first inlet to the coolant flow passage being spaced apart from the second inlet to the coolant flow passage along a length of the heat sink unit, and the outlet of the heat sink unit being between the first and second inlets to the coolant flow passage, such that coolant entering the first and second inlets to the coolant flow passage is exhausted via the outlet of the heat sink unit; and
wherein the first inlet to the coolant flow passage is configured to receive the coolant from a heat sink.

2. The compressor module of claim 1, wherein the heat exchanger is provided as a stator vane.

3. The compressor module of claim 1, wherein: A compressor module, comprising:
an inlet and an outlet;
a working fluid flow duct between the compressor module inlet and the compressor module outlet;
a heat exchanger and a compressor rotor stage each in the working fluid flow duct, wherein the heat exchanger is in flow series between the compressor module inlet and the compressor rotor stage, and includes a wall having an external surface which is located in the working fluid flow duct, and wherein the compressor rotor stage is in flow series between the heat exchanger and the compressor module outlet; and
a heat sink unit which defines a portion of the working fluid flow duct in flow series between the compressor rotor stage and compressor module outlet;
wherein the heat exchanger is in heat transfer communication with the heat sink unit, such that the heat exchanger is operable to transfer heat to the heat sink unit from working fluid passing the heat exchanger;
wherein the heat sink unit defines a coolant flow passage for the transfer of a coolant;
wherein the heat sink unit defines an inlet to the coolant flow passage and an outlet from the coolant flow passage;
wherein the coolant flow passage comprises a portion which extends adjacent to the portion of the working fluid flow duct as it extends along the heat sink unit, and wherein a body of the heat sink unit which defines the working fluid flow duct portion and coolant flow passage portion is configured such that it is operable to transfer heat to the coolant from the working fluid; and
wherein the inlet to the coolant flow passage is configured to receive the coolant from a heat sink.

4. The compressor module of claim 3, wherein the inlet to the coolant flow passage is a first inlet to the coolant flow passage, and wherein the heat sink unit defines a second inlet to the coolant flow passage, and wherein the first inlet to the coolant flow passage is spaced apart from the second inlet to the coolant flow passage along a length of the heat sink unit, and wherein the outlet heat sink unit is provided between the first and second inlets to the coolant flow passage, such that coolant entering the first and second inlets to the coolant flow passage is exhausted via the outlet of the heat sink unit.

5. A thermodynamic apparatus comprising the compressor module of claim 3.

6. A compressor assembly comprising multiple compressor modules, each compressor module comprising:
   an inlet and an outlet;
   a working fluid flow duct between the compressor module inlet and the compressor module outlet;
   a heat exchanger and a compressor rotor stage each in the working fluid flow duct, wherein the heat exchanger is in flow series between the compressor module inlet and the compressor rotor stage, and includes a wall having an external surface which is located in the working fluid flow duct, and wherein the compressor rotor stage is in flow series between the heat exchanger and the compressor module outlet; and
   a heat sink unit which defines a portion of the working fluid flow duct in flow series between the compressor rotor stage and compressor module outlet;
   wherein the heat exchanger is in heat transfer communication with the heat sink unit, such that the heat exchanger is operable to transfer heat to the heat sink unit from working fluid passing the heat exchanger; and
   wherein the compressor modules are aligned in sequence such that the working fluid flow duct extends from the compressor module inlet of the first module in the sequence to the compressor module outlet of the last module of the sequence.

7. The compressor module of claim 1, wherein the heat exchanger is a first heat exchanger, and wherein a second heat exchanger is located in the working fluid flow duct in flow series between the compressor rotor stage and the compressor module outlet in the heat sink unit, the second heat exchanger includes a wall having an external surface which is located in the working fluid flow duct, such that the second heat exchanger is operable to transfer heat to the heat sink unit from the working fluid passing the second heat exchanger.

8. A compressor module, comprising:
   an inlet and an outlet;
   a working fluid flow duct between the compressor module inlet and the compressor module outlet;
   a compressor rotor stage in the working fluid flow duct;
   a heat sink unit which defines a portion of the working fluid flow duct in flow series between the compressor rotor stage and compressor module outlet;
   a first heat exchanger the working fluid flow duct, wherein the first heat exchanger is in flow series between the compressor module inlet and the compressor rotor stage, and includes a wall having an external surface which is located in the working fluid flow duct, and wherein the compressor rotor stage is in flow series between the first heat exchanger and the compressor module outlet, wherein the first heat exchanger is in heat transfer communication with the heat sink unit, such that the first heat exchanger is operable to transfer heat to the heat sink unit from working fluid passing the first heat exchanger; and
   a second heat exchanger is located in the working fluid flow duct in flow series between the compressor rotor stage and the compressor module outlet in the heat sink unit, the second heat exchanger includes a wall having an external surface which is located in the working fluid flow duct, such that the second heat exchanger is operable to transfer heat to the heat sink unit from working fluid passing the second heat exchanger;
   wherein the heat sink unit defines a flow port in fluid communication with the working fluid flow duct and in flow series between the second heat exchanger and compressor module outlet.

9. The compressor module of claim 8, wherein the wall of the second heat exchanger comprises a cavity which defines part of the coolant flow passage.

10. A compressor assembly comprising multiple compressor modules of claim 8, the compressor modules aligned in sequence such that the working fluid flow duct extends from the compressor module inlet of the first module in the sequence to the compressor module outlet of the last module of the sequence.

11. A thermodynamic apparatus comprising the compressor assembly of claim 10.

12. The compressor module of claim 7, wherein the compressor rotor stage comprises:
   a plurality of first heat exchangers; and
   a plurality of second heat exchangers.

13. The compressor module of claim 1, wherein the heat sink unit defines a coolant flow passage for the transfer of a coolant, and wherein the coolant flow passage is isolated from the working fluid flow duct such that the coolant does not come into direct contact with the working fluid.

14. The compressor module of claim 1, wherein the compressor rotor stage is carried on a shaft, the compressor rotor stage and shaft being rotatable together around the first rotational axis.

15. A compressor assembly comprising multiple compressor modules of claim 14, the compressor modules aligned in sequence such that the working fluid flow duct extends from the compressor module inlet of the first module in the sequence to the compressor module outlet of the last module of the sequence.

16. A thermodynamic apparatus comprising the compressor module of claim 1.

17. The thermodynamic apparatus of claim 16, wherein the working fluid duct is a first working fluid duct, the heat exchanger is a first heat exchanger, comprising:
   a turbine module defining a second working fluid flow duct between a turbine module inlet and a turbine module outlet, the turbine module including
   a second heat exchanger and a turbine rotor stage each in the second working fluid flow duct, wherein the second heat exchanger is in flow series between the turbine module inlet and the turbine rotor stage, and includes a wall having an external surface which is located in the second working fluid flow duct, and wherein the turbine rotor stage is in flow series between the second heat exchanger and the turbine module outlet; and
   a heat supply unit which defines a portion of the second working fluid flow duct in flow series between the turbine rotor stage and turbine module outlet;
   wherein the second heat exchanger is in heat transfer communication with the heat supply unit, such that the second heat exchanger is operable to transfer heat received from the heat supply unit to working fluid passing the second heat exchanger.

18. The compressor module of claim 1, wherein the heat sink unit defines a coolant flow passage for the transfer of a coolant, and wherein the coolant flow passage comprises a portion which extends adjacent to the portion of the working fluid flow duct as it extends along the heat sink unit, and wherein a body of the heat sink unit which defines the working fluid flow duct portion and coolant flow passage portion is configured such that it is operable to transfer heat to the coolant from the working fluid.

19. The compressor module of claim 1, wherein the heat sink unit defines a coolant flow passage for the transfer of a coolant, and wherein the wall of the heat exchanger comprises a cavity which defines part of the coolant flow passage.

20. The compressor module of claim 19, wherein a flow baffle member is in the heat exchanger cavity.

* * * * *

UNITED STATES PATENT AND TRADEMARK OFFICE
CERTIFICATE OF CORRECTION

PATENT NO. : 12,078,113 B2
APPLICATION NO. : 17/282044
DATED : September 3, 2024
INVENTOR(S) : James William Spain Page 1 of 1

It is certified that error appears in the above-identified patent and that said Letters Patent is hereby corrected as shown below:

In the Claims

In Claim 3, Column 18, Line 26, delete "The compressor module of claim 1, wherein:".

Signed and Sealed this
Seventeenth Day of December, 2024

Derrick Brent
*Acting Director of the United States Patent and Trademark Office*